US009542751B2

(12) United States Patent
Mannino et al.

(10) Patent No.: US 9,542,751 B2
(45) Date of Patent: Jan. 10, 2017

(54) SYSTEMS AND METHODS FOR REDUCING A PLURALITY OF BOUNDING REGIONS

(71) Applicant: QUALCOMM Incorporated, San Diego, CA (US)

(72) Inventors: Matteo Toti Mannino, San Diego, CA (US); Xin Zhong, San Diego, CA (US); Dashan Gao, San Diego, CA (US); Gokce Dane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/707,929

(22) Filed: May 8, 2015

(65) Prior Publication Data

US 2016/0328856 A1 Nov. 10, 2016

(51) Int. Cl.
| | | |
|---|---|---|
| *G06K 9/00* | (2006.01) | |
| *G06T 7/00* | (2006.01) | |
| *G06K 9/20* | (2006.01) | |
| *G06K 9/32* | (2006.01) | |
| *G06K 9/46* | (2006.01) | |

(52) U.S. Cl.
CPC ........... *G06T 7/0081* (2013.01); *G06K 9/2054* (2013.01); *G06K 9/3233* (2013.01); *G06K 9/4652* (2013.01); *G06T 7/0093* (2013.01); *G06T 2207/10024* (2013.01); *G06T 2207/20021* (2013.01); *G06T 2210/12* (2013.01)

(58) Field of Classification Search
CPC . G06T 7/0081; G06T 7/0083; G06K 2209/21; G06K 2209/23; G06K 9/00463; G06K 9/4642
See application file for complete search history.

(56) References Cited

U.S. PATENT DOCUMENTS

| | | | |
|---|---|---|---|
| 8,861,864 B2 | 10/2014 | Hong et al. | |
| 9,329,827 B2* | 5/2016 | Lavine | .................... G06F 3/14 |
| 2002/0159636 A1* | 10/2002 | Lienhart | ................ G06K 9/325 |
| | | | 382/176 |
| 2004/0017941 A1* | 1/2004 | Simske | ............. G06K 9/00456 |
| | | | 382/180 |
| 2007/0127774 A1 | 6/2007 | Zhang et al. | |
| 2007/0183661 A1 | 8/2007 | El-Maleh et al. | |
| 2011/0158558 A1 | 6/2011 | Zhao et al. | |

(Continued)

FOREIGN PATENT DOCUMENTS

| | | |
|---|---|---|
| CN | 102682454 A | 9/2012 |
| CN | 103366359 A | 10/2013 |

(Continued)

OTHER PUBLICATIONS

Hamzaoui A., et al., "Object-Based Visual Query Suggestion," Multimed Tools Appl, 2014, vol. 68, pp. 429-454.

(Continued)

*Primary Examiner* — Li Liu
(74) *Attorney, Agent, or Firm* — Austin Rapp & Hardman

(57) ABSTRACT

A method performed by an electronic device is described. The method includes generating a plurality of bounding regions based on an image. The method also includes determining a subset of the plurality of bounding regions based on at least one criterion and a selected area in the image. The method further includes processing the image based on the subset of the plurality of bounding regions.

26 Claims, 18 Drawing Sheets

Example A 102a

Example B 102b

Example C 102c

(56) References Cited

U.S. PATENT DOCUMENTS

| | | | |
|---|---|---|---|
| 2011/0243443 A1 | 10/2011 | Varekamp | |
| 2012/0078899 A1 | 3/2012 | Fontana et al. | |
| 2013/0208947 A1* | 8/2013 | Kang | G06T 7/20 382/103 |
| 2014/0003686 A1 | 1/2014 | Fontanarosa | |
| 2014/0028842 A1* | 1/2014 | Abramson | H04N 7/18 348/143 |
| 2014/0126821 A1 | 5/2014 | Criminisi et al. | |
| 2015/0222859 A1* | 8/2015 | Schweid | G06K 9/00624 348/148 |
| 2015/0334398 A1 | 11/2015 | Socek et al. | |
| 2016/0125249 A1* | 5/2016 | Mei | G06K 9/00791 382/103 |

FOREIGN PATENT DOCUMENTS

| | | |
|---|---|---|
| WO | 2013144418 A1 | 10/2013 |
| WO | 2016029399 | 3/2016 |

OTHER PUBLICATIONS

Zitnick C.L., et al., "Edge Boxes: Locating Object Proposals from Edges," Computer Vision—ECCV 2014, Lecture Notes in Computer Science, 2014, vol. 8693, pp. 391-405.

Partial International Search Report—PCT/US2016/019334—ISA/EPO—Jul. 11, 2016.

Tinghuai W., et al., "TouchCut: Fast Image and Video Segmentation using Single-Touch Interaction," Computer Vision and Image Understanding, Nov. 12, 2013 (Nov. 12, 2013), vol. 120, pp. 14-30, XP028605679, ISSN: 1077-3142, DOI: 10.1016/J.CVIU.2013.10.013.

International Search Report and Written Opinion—PCT/US2016/019334—ISA/EPO—Sep. 2, 2016.

\* cited by examiner

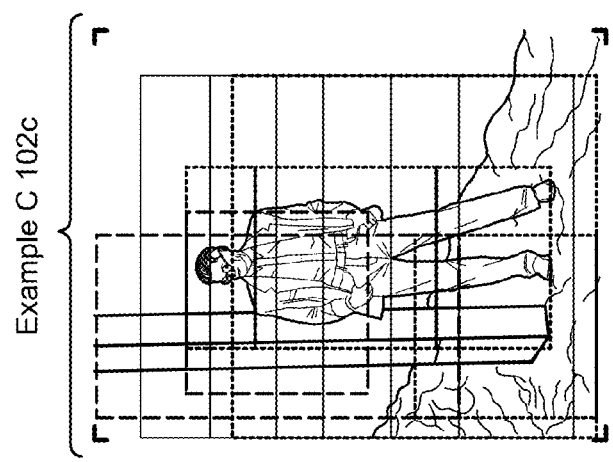
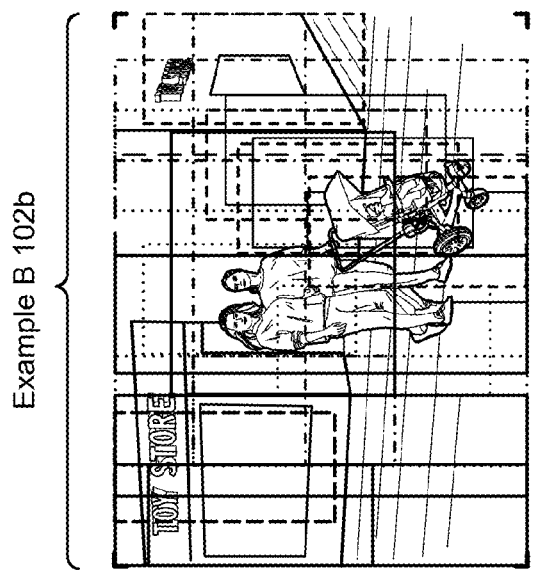
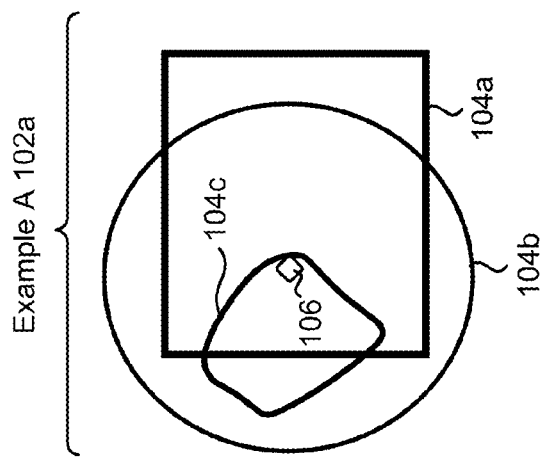
FIG. 1

SYSTEMS AND METHODS FOR REDUCING A PLURALITY OF BOUNDING REGIONS

FIELD OF DISCLOSURE

The present disclosure relates generally to electronic devices. More specifically, the present disclosure relates to systems and methods for reducing a plurality of bounding regions.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture and/or utilize images. For example, a smartphone may capture and/or process still and/or video images. Processing images may demand a relatively large amount of time, memory and energy resources. The resources demanded may vary in accordance with the complexity of the processing.

It may be difficult to implement some complex processing tasks. For example, some processing tasks may take a long time to complete and/or may yield undesirable results. This may be especially true in mobile platforms (e.g., mobile devices such as smartphones, tablets, laptop computers, etc.) that may have limited processing, memory and/or energy resources (e.g., limited battery life). As can be observed from this discussion, systems and methods that improve image processing may be beneficial.

SUMMARY

A method performed by an electronic device is described. The method includes generating a plurality of bounding regions based on an image. The method also includes determining a subset of the plurality of bounding regions based on at least one criterion and a selected area in the image. The method further includes processing the image based on the subset of the plurality of bounding regions. Generating the plurality of bounding regions may be based on a gradient-based bounding region generation algorithm. Processing the image may include performing object recognition, object tracking, focusing, object removal, image enhancement, cropping and/or compression.

Determining the subset of the plurality of bounding regions may be based on a centeredness of each of the plurality of bounding regions relative to the selected area. Determining the subset of the plurality of bounding regions may be based on a comparison between a color histogram of each bounding region and a color histogram of each respective surrounding region. Determining the subset of the plurality of bounding regions may be based on an average size of the plurality of bounding regions. The average size may be a median size and/or a mean size.

Determining a subset of the plurality of bounding regions may include rejecting any of the plurality of bounding regions that fail a centeredness criterion and/or a first size criterion. Determining a subset of the plurality of bounding regions may also include selecting a bounding region that meets the color difference criterion and/or a second size criterion. The second size criterion may be met for a bounding region with a weighted median size or a weighted mean size.

Determining a subset of the plurality of bounding regions may include rejecting any of the plurality of bounding regions that fail a centeredness criterion to produce a plurality of remaining bounding regions. Determining a subset of the plurality of bounding regions may also include determining a color distance between each of the plurality of remaining bounding regions and a respective surrounding region and selecting a bounding region with a largest color distance.

An electronic device is also described. The electronic device includes a processor configured to generate a plurality of bounding regions based on an image, to determine a subset of the plurality of bounding regions based on at least one criterion and a selected area in the image and to process the image based on the subset of the plurality of bounding regions.

A computer-program product is also described. The computer-program product includes a non-transitory computer-readable medium with instructions. The instructions include code for causing an electronic device to generate a plurality of bounding regions based on an image. The instructions also include code for causing the electronic device to determine a subset of the plurality of bounding regions based on at least one criterion and a selected area in the image. The instructions further include code for causing the electronic device to process the image based on the subset of the plurality of bounding regions.

Another method performed by an electronic device is also described. The method includes determining a selected area of an image. The method also includes selecting a bounding region generation algorithm from a plurality of bounding region generation algorithms based on the selected area. The method further includes generating one or more bounding regions based on the selected bounding region generation algorithm.

BRIEF DESCRIPTION OF THE DRAWINGS

FIG. 1 illustrates several examples of bounding regions within an image;

DETAILED DESCRIPTION

Figure 2:
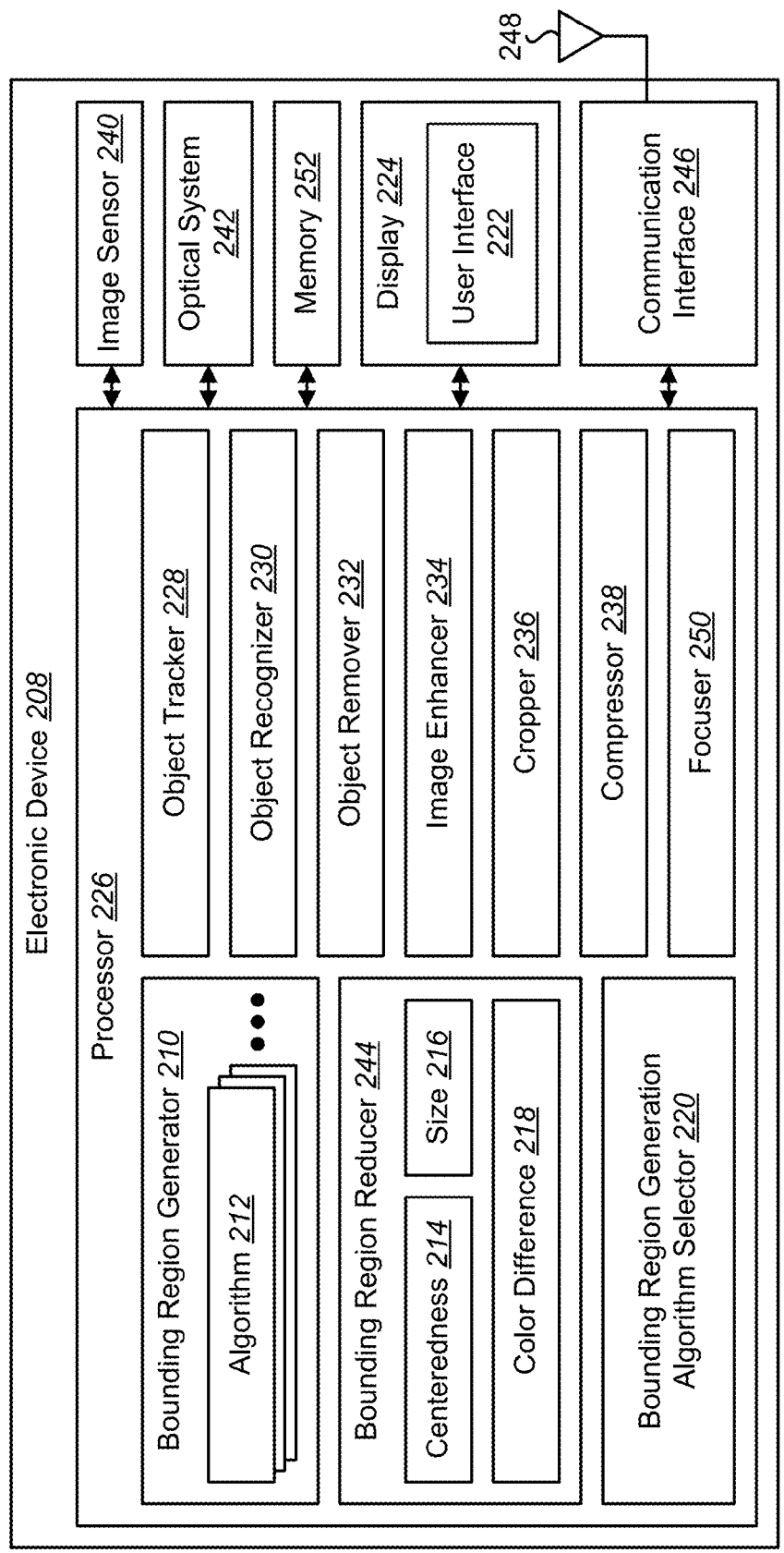
FIG. 2 is a block diagram illustrating one example of an electronic device in which systems and methods for selecting a bounding region generation algorithm and/or for reducing a plurality of bounding regions may be implemented.

Various configurations are now described with reference to the FIGS, where like reference numbers may indicate functionally similar elements. The systems and methods as generally described and illustrated in the FIGS herein could be arranged and designed in a wide variety of different configurations. Thus, the following more detailed description of several configurations, as represented in the FIGS, is not intended to limit scope, as claimed, but is merely representative of the systems and methods.

FIG. 1 illustrates several examples 102a-c of bounding regions within an image. A bounding region may be a closed shape that bounds one or more pixels of an image. Bounding regions may be regular or irregular in shape. For instance, a bounding region may be a rectangle, a square, a circle, an ellipse, a trapezoid, a polygon, a closed curve, etc. Bounding regions may differ in size. As illustrated in FIG. 1, example A 102a illustrates several types of bounding regions 104a-c. Specifically, bounding region A 104a is rectangular in shape, bounding region B 104b is circular in shape and bounding region C 104c is irregular in shape. In some configurations, a bounding region may also be referred to as a region of interest (ROI) or a bounding box (for rectangular bounding regions, for instance). A bounding region may completely contain an object, may partially contain an object or may not contain an object. In some configurations, a bounding region may overlap a portion (e.g., at least a portion) of an object (e.g., ground truth object). For example, a bounding region may overlap 66% or two-thirds of an object.

Bounding region generation algorithms may generate one or more bounding regions (e.g., bounding boxes). Examples of bounding region generation algorithms include region grow and gradient-based bounding region generation algorithms. Binarized normed gradients (BING) may be one example of a gradient-based bounding region generation algorithm. For instance, gradient-based bounding region generation algorithms may generate one or more initial bounding regions (e.g., bounding boxes) using gradient-based analysis of an image. Bounding region generation algorithms may be utilized to find (e.g., detect, track, etc.) objects in images.

In some configurations, a bounding region generation algorithm may determine one or more bounding regions based on a selected area (e.g., a selected point, a touch point, one or more pixels, etc.) Example A 102a illustrates a selected area 106. In some configurations, the selected area 106 may be based on a received input. For example, a smartphone may detect a touch point from a touchscreen, where the touch point indicates one or more pixels on an image. In another example, a computer may select a pixel based on a mouse click event, where a cursor location corresponds to a pixel in an image. Accordingly, example A 102a illustrates different bounding regions 104a-c that may be based on the selected area 106 (e.g., selected point, touch point, one or more pixels, etc.).

One objective that may be addressed by the systems and methods disclosed herein may be to enable a user to select an object within an image from a camera simply by touching the object within the image presented on a touch sensitive display. With each touch point, an algorithm may generate multiple bounding regions that could contain the object the user has selected. Examples B 102b and C 102c illustrate examples of multiple bounding regions that may be generated by a bounding region generation algorithm. Specifically, example B 102b illustrates a plurality of bounding regions in an image. In example B 102b, the bounding regions are rectangular bounding regions with different sizes. Similarly, example C 102c illustrates a plurality of rectangular bounding regions of different sizes in an image. The plurality of bounding regions may be reduced. For example, one or more of the plurality of bounding regions (e.g., a subset of the bounding regions) may be selected. In some configurations, one bounding region of the plurality of bounding regions may be determined. For example, a bounding region that includes the intended object may advantageously be determined. The systems and methods disclosed herein may provide one or more approaches for solving this problem.

FIG. 2 is a block diagram illustrating one example of an electronic device 208 in which systems and methods for selecting a bounding region generation algorithm and/or for reducing a plurality of bounding regions may be implemented. Examples of the electronic device 208 include smartphones, cellular phones, computers (e.g., desktop computers, laptop computers, etc.), tablet devices, media players, televisions, gaming consoles, personal digital assistants (PDAs), robots, aircraft, unmanned aerial vehicles (UAVs), automobiles, etc. The electronic device 208 may include one or more components or elements. One or more of the components or elements may be implemented in hardware (e.g., circuitry) or a combination of hardware and software (e.g., a processor with instructions). In some configurations, the electronic device 208 may include a processor 226, an image sensor 240, an optical system 242, a memory 252, a display 224 and/or a communication interface 246. The processor 226 may be coupled to (e.g., in electronic communication with) one or more of the image sensor 240, optical system 242, memory 252, display 224 and communication interface 246.

The communication interface 246 may enable the electronic device 208 to communicate with one or more other electronic devices. For example, the communication interface 246 may provide an interface for wired and/or wireless communications. In some configurations, the communication interface 246 may be coupled to one or more antennas 248 for transmitting and/or receiving radio frequency (RF) signals.

The electronic device 208 may obtain one or more images (e.g., digital images). In some configurations, the electronic device 208 may receive the one or more images from another device (e.g., an image sensor coupled to the electronic device 208, a networked device, a remote server, an external drive (e.g., flash drive, an external hard drive), a memory card, etc.). For example, the electronic device 208 may receive the one or more images via the communication interface 246 using wired and/or wireless communications. Additionally or alternatively, the electronic device 208 may capture the one or more images. For example, the electronic device 208 may include a camera. The camera may include the image sensor 240 and the optical system 242 (e.g., lenses) that focuses images of objects that are located within the field of view of the optical system 242 onto the image sensor 240. The image sensor 240 may capture one or more images. In some configurations, the electronic device 208 may include a camera software application and a display 224. When the camera application is running, images of objects that are located within the field of view of the optical system 242 may be recorded by the image sensor 240. The images that are being recorded by the image sensor 240 may be presented on the display 224. In some configurations, these images may be displayed in rapid succession at a relatively high frame rate so that, at any given moment in time, the objects that are located within the field of view of the optical system 242 are presented on the display 224. The one or more images obtained by the electronic device 208 may be one or more video frames and/or one or more still images. The terms video frame and digital image may be used interchangeably herein.

In some configurations, the electronic device 208 may present a user interface 222 on the display 224. For example, the user interface 222 may enable a user to indicate one or more objects in an image.

In some configurations, the display 224 may be a touchscreen that receives input from physical touch (by a finger, stylus or other tool, for example). For instance, the touchscreen may be an input interface that receives touch input indicating a selected area. In some configurations, the selected area may correspond to a target object. For example, if the electronic device 208 is capturing a nature scene that includes an animal, a user may tap on an image of the animal (indicating a directive that the animal be detected, tracked and/or that some other operation performed, for example).

Additionally or alternatively, the electronic device 208 may include or be coupled to another input interface. For example, the electronic device 208 may include a camera facing a user and may detect user gestures (e.g., hand gestures, arm gestures, eye tracking, eyelid blink, etc.) for indicating a selected area (e.g., a selected point, etc.) in an image. In another example, the electronic device 208 may be coupled to a mouse and may detect a mouse click indicating a selected area (e.g., point) in an image. Accordingly, one or more selected areas (corresponding to target objects, for example) may be indicated (e.g., selected) in any suitable way. For example, a touch input, a mouse click, a recognized gesture, facial recognition, object recognition, etc., may be used to indicate a selected area (e.g., point).

In some configurations, no user input may be necessary. For example, the electronic device 208 may automatically detect one or more objects (e.g., faces, people, animals, cars, signs, text, etc.) in the one or more images. One or more selected areas may be determined based on the one or more detected objects. One example of a selected area is given in connection with FIG. 4.

The processor 226 may include and/or implement a bounding region generator 210. The bounding region generator 210 may generate a plurality of bounding regions based on an image. For example, the bounding region generator 210 may employ one or more bounding region generation algorithms 212 to generate the plurality of bounding regions (e.g., bounding boxes). Examples of the bounding region generation algorithms 212 include region grow and gradient-based bounding region generation algorithms (e.g., binarized normed gradients (BING)). It should be noted that one or more other object detection algorithms may be utilized to generate the initial bounding regions (e.g., bounding boxes). As described above, one or more of the bounding regions generated may include an object. One example of a bounding region is given in connection with FIG. 4.

The processor 226 may include and/or implement a bounding region reducer 244. The bounding region reducer 244 may determine a subset of the plurality of bounding regions based on a selected area of the image. For example, an objective of the bounding region reducer 244 may be to reduce the plurality of bounding regions to one or more bounding regions that include an object (e.g., an indicated object). For instance, the indicated object may be an object that corresponds to a selected area (e.g., one or more selected points, a selected pixel or group of pixels, etc.). As described above, the selected area may be indicated based on an input or may be automatically generated. For example, the electronic device 208 may receive an input (e.g., a touch input, a touch point, a mouse click, etc.). The input may indicate the location of an object in the image. For example, the input may indicate the selected area (e.g., one or more pixels) where an object is located in the image.

The bounding region reducer 244 may determine a subset of the plurality of bounding regions by applying one or more criteria. This may reduce the plurality of bounding regions to a subset. One or multiple reductions may be performed. For example, multiple reductions may be performed (each in accordance with a criterion, for example). Each reduction may result in a subset of the plurality of bounding regions.

In some configurations, the bounding region reducer 244 may determine the subset of the plurality of bounding regions based on one or more of a centeredness criterion 214, a size criterion 216 and a color difference criterion 218. The centeredness criterion 214 may be a rule that distinguishes between bounding regions based on centeredness. Any of the plurality of bounding regions that do not meet the centeredness criterion 214 may be rejected (e.g., removed from consideration, eliminated, deleted, discarded, etc.). For example, the bounding region reducer 244 may reduce the plurality of bounding regions by eliminating any bounding region(s) that are not centered enough (e.g., not within a center distance threshold and/or not among a number of the smallest center distances).

In some configurations, determining the subset of the plurality of bounding regions may be based on a center distance of each of the plurality of bounding regions. The bounding region reducer 244 may calculate the center distance of each of the plurality of bounding regions. In one example, the center distance of a bounding region may be a distance between the center (e.g., centroid) of the bounding region and the selected area (e.g., the selected point, the center or centroid of the selected area when the selected area is larger than a point or the edge (e.g., nearest edge) of the selected area when the selected area is larger than a point, etc.). In another example, the center distance of a bounding region may be a distance between the center (e.g., centroid) of the bounding region and the center (e.g., centroid) of the union of all of the bounding regions. Thus, bounding regions with smaller center distances may be considered more centered. In some configurations, center distance may be expressed as a distance in pixels or other metric (e.g., inches, centimeters, millimeters, etc.).

In some configurations, the centeredness criterion 214 may be expressed in terms of a center distance threshold and/or a number of the most centered bounding regions. For example, the centeredness criterion 214 may be met for all bounding regions within a center distance threshold (e.g., any bounding region with a center distance that is less than or equal to the center distance threshold). The center distance threshold may be a predetermined distance, a relative distance and/or a statistical distance. A predetermined distance may be a predetermined number of pixels, inches, centimeters, etc. A relative distance may be, for example, a proportion, percentage or ratio of the (largest) distance between the furthest bounding region center and the selected area or of the (largest) distance between the furthest bounding region edge and the center (e.g., centroid) of the union of all of the bounding regions. For instance, the centeredness criterion 214 may be met for any bounding region with a center distance that is less than or equal to a tenth of the largest distance. A statistical distance may be a statistical measure of the bounding region center distances, such as a standard deviation or scaled standard deviation of all of the bounding region center distances, for example. For instance, the centeredness criterion 214 may be met for any bounding region with a center distance that is less than or equal to a standard deviation of the bounding region center distances.

In another example, the centeredness criterion 214 may be met for a number of the most centered bounding regions. For instance, the centeredness criterion 214 may be met for the ten bounding regions with the smallest center distances.

In some configurations, the center distance may be determined and the centeredness criterion may be applied as follows. Assuming a center coordinate of a selected area is $vc=(xc, yc)$ and the center of a first bounding box (e.g., bounding box 1) is $vb1=(xb1, yb1)$, the center distance between vc and vb1 may be compared with, for example, the L2 norm. The center distance may be determined for one or more of the bounding boxes. The center distance(s) may then be compared with a center distance threshold. Those bounding boxes with center distances greater than threshold may be rejected (e.g., eliminated).

Additionally or alternatively, the centeredness criterion may be applied as follows. A parameter $\epsilon$ may be selected, where c may be a value between 0.0 and 0.5. For example, $\epsilon$ may be predetermined or may be selected during operation (e.g., adapted). As described above, a plurality of bounding regions (e.g., bounding boxes) within an image may be generated (using BING or some other bounding region generation algorithm, for instance). Assume that P denotes the selected area (e.g., selected point, pixel, etc.), where (x, y) coordinates of P are denoted P.x and P.y. P may be inside a number of the generated bounding boxes. A bounding box may be denoted (x, y, w, h), where x and y are the top left coordinates and w, h are the width and height. Any of the bounding boxes that contain P (e.g., P.x and P.y) and that satisfy the centeredness criterion 214 may be kept, while the rest may be rejected (e.g., discarded). The centeredness criterion 214 may be implemented as follows. For $\epsilon$, bounding boxes that satisfy $x+\epsilon*w \leq P.x$ AND $P.x \leq x+(1-\epsilon)*w$ AND $y+\epsilon*h \leq P.y$ AND $P.y \leq y+(1-\epsilon)*h$ may be kept. Visually, this means that the selected area (e.g., selected point) P may be kept if it is close to the center of the bounding box (e.g., within a smaller bounding box inside the bounding box). It should be noted that if $\epsilon=0.5$, there is only one acceptable point in the middle of the bounding box: $(x+0.5*w, y+0.5*h)$. Moreover, no point can satisfy the centeredness criteria with c greater than 0.5.

The size criterion 216 may be a rule that distinguishes between bounding regions based on size. Any of the plurality of bounding regions that do not meet the size criterion 216 may be rejected (e.g., removed from consideration, eliminated, deleted, discarded, etc.). For example, the bounding region reducer 244 may reduce the plurality of bounding regions by eliminating any bounding region(s) that are not an average size and/or are not close enough to an average size (e.g., not within an average size threshold and/or not among a number of bounding regions with closest to average sizes).

In some configurations, determining the subset of the plurality of bounding regions may be based on an average size (e.g., mean, median, etc.) of the plurality of bounding regions. For example, the bounding region reducer 244 may calculate an average size (e.g., mean, median, etc.) of the plurality of bounding regions. In some configurations, a "size" of a bounding region may be a geometric area (e.g., number of pixels, square inches (or other measure, for example), etc.) of the bounding region. In other configurations, the "size" of a bounding region may be expressed as a height, a width or another measure (e.g., a diagonal measure, largest dimension, etc.).

The bounding region reducer 244 may calculate the size of each of the plurality of bounding regions. In some configurations, the size criterion 216 may be expressed in terms of one or more size thresholds and/or a number of the nearest to average size bounding regions. For example, the size criterion 216 may be met for all bounding regions within one or more size thresholds (e.g., any bounding region with a size that is within a first size threshold larger than the average size or that is within a second size threshold smaller than the average size). One or more of the size thresholds may be a predetermined size, a relative size and/or a statistical size. A predetermined size may be a predetermined number of pixels, square inches, square centimeters, etc. A relative size may be, for example, a proportion, percentage or ratio of the average size. For instance, the size criterion 216 may be met for any bounding region with a size that is within ten percent of the average size. A statistical size may be a statistical measure of the bounding region sizes, such as a standard deviation or scaled standard deviation of all of the bounding region sizes, for example. For instance, the size criterion 216 may be met for any bounding region with a size that is within a standard deviation of the average (e.g., mean) bounding region size.

In another example, the size criterion 216 may be met for a number of the bounding regions with nearest to average size (e.g., the nearest to average size of the plurality of bounding regions). For instance, the size criterion 216 may be met for the ten bounding regions that are closest in size (larger and/or smaller) to the average bounding region size.

In some configurations, the bounding region size for comparison may be determined by using the sizes of bounding regions that pass through (e.g., that include and/or are in contact with) the selected area (e.g., touch point). For example, bounding box size for comparison may be an average of the bounding box sizes or the median of the bounding box size. For instance, the width of n boxes may be denoted $\{w1, w2, \ldots, wn\}$ and the height of n boxes may be denoted $\{h1, h2, \ldots, hn\}$. The average width (wavg) may be a mean of w1 to wn and the average height (havg) may be mean of h1 to hn. Alternatively, the average width may be a median of w1 to wn and the average height may be a median of h1 to hn. The width and height of all bounding boxes may be compared to the average (e.g., mean or median). Bounding boxes outside of a size threshold (sizeth) range may be rejected (e.g., eliminated). For example, a first bounding box with w1>(wavg+sizeth) & h1>(havg+sizeth) may be rejected, where sizeth may be 0 or some other value.

Additionally or alternatively, the size criterion 216 may be based on maximum and/or minimum width and/or height. For example, the bounding region reducer 244 may select maximum and minimum heights and maximum and minimum widths. The maximum and minimum heights and widths may be selected based on an expected object size. For instance, a maximum height may be 1.5 times the expected object height and a minimum height may be 0.5 times the expected object height, while a maximum width may be 1.5 times the expected object width and a minimum width may be 0.5 times the expected object width. Bounding regions that are not within the maximum and/or minimum heights and/or widths may be rejected. It should be noted that in some configurations, additional constraints may be placed on the maximum and/or minimum heights and/or widths. For example, maximum dimensions may not be larger than half of an image size. Additionally or alternatively, minimum dimensions may not be smaller than a predetermined size (e.g., 16×16 pixels).

The color difference criterion 218 may be a rule that distinguishes between bounding regions based on color difference. Any of the plurality of bounding regions that do not meet the color difference criterion 218 may be rejected (e.g., removed from consideration, eliminated, deleted, discarded, etc.). For example, the bounding region reducer 244 may reduce the plurality of bounding regions by eliminating any bounding region(s) that do not have the greatest color distance (or that are not among a number of bounding regions with the greatest color distances, for example).

In some configurations, determining the subset of the plurality of bounding regions may be based on color difference of each the plurality of bounding regions. For example, the bounding region reducer 244 may calculate a color distance for each of the plurality of bounding regions. A "color distance" of a bounding region may be a measure of color difference between a bounding region and a surrounding region (e.g., a region completely or partially around the bounding region). The bounding region reducer 244 may calculate the color distance of each of the plurality of bounding regions. In some configurations, determining the subset of the plurality of bounding regions is based on a comparison between a color histogram of each bounding region and a color histogram of each respective surrounding region. For example, the bounding region reducer 244 may determine a color histogram in the bounding region and a color histogram from a surrounding region. One example of a bounding region and a surrounding region is given in connection with FIG. 4. The bounding region reducer 244 may calculate a histogram distance (e.g., a Chi-Squared distance) based on the histograms to determine the color distance (e.g., how different the bounding region is from the surrounding region).

In some configurations, the color distance may be computed between two histograms (e.g., hist1=[a1 a2 a3 ... a24] and hist2=[b1 b2 b3 ... b24]). For example, the color distance may be a simple difference between the histograms (as a summation of $(ai-bi)^2$ over a range of i (e.g., i=1 to 24), for example). In other examples, weights may be used. With weights (wti), for instance, the equation may be a summation of $wti \times (ai-bi)^2$ over a range of i (e.g., i=1 to 24). The weights may be different for each bin of color components.

In some configurations, the color difference criterion 218 may be expressed in terms of one or more of the greatest color distances and/or a color distance threshold. For example, the color difference criterion 218 may be met for a bounding region with the greatest color distance (or for a number of bounding regions with the greatest color distances). In another example, the color difference criterion 218 may be met for all bounding regions greater than a color distance threshold (e.g., a predetermined color distance threshold).

In some configurations, the color difference criterion 218 may be implemented in accordance with the following. Assume that hbb is a color histogram of a candidate bounding box. For example, hbb may have 8 bins per color component or 6 bins per color component. The color space may be, for example, YCbCr (luma, blue difference and red difference), RGB (red, green, blue) or another color space. For instance, YCbCr may be a color space of a processing pipeline for an application. Another box larger (to enclose a surrounding region, for example) than the candidate bounding box may be determined. For example, the width and height of the larger box may be width*1.25 and height*1.25 of the candidate bounding box. The larger box may be centered on the candidate bounding box. Another color histogram for the larger box may be calculated, denoted hlargebb. The boxes hbb and hlargebb may be treated as vectors (with length 24, for example). The color distance between hbb and hlargebb may be calculated. For example, an L2 norm may be utilized to find the color distance. Instead of the L2 norm, for example, an alternative distance calculation may be utilized, like a Chi-Squared distance. If the color distance is small (e.g., less than a color distance threshold or smaller a color distance of another bounding box), the candidate bounding box may be rejected (e.g., eliminated). If the color distance is large (e.g., larger than a color distance threshold or larger than the color distance of another bounding box), then the candidate bounding box may be preserved (as a bounding box that includes an object, for example). In configurations where there are no more criteria to check (e.g., when the color difference criterion 218 is the last criterion), for example, the bounding box with the largest color distance (of the plurality of bounding boxes, for example) may be selected.

Additional or alternative approaches for implementing the color difference criterion 218 may be implemented. For example, the bounding region reducer 244 may determine mean color (e.g., RGB) values inside of the bounding region and outside of the bounding region (e.g., in the surrounding region) and may compute a color difference (e.g., Euclidean distance) between the mean color values. In this approach, the bounding region with the largest color difference (of the plurality of bounding regions, for example) may be selected (while other bounding regions may be rejected).

It should be noted that using color to reduce the plurality of bounding regions may be advantageous since some bounding region generation algorithms (e.g., object boundary box providers) may not utilize color information. For example, some bounding region generation algorithms may only check gradients. Adding color information provides extra information to select the bounding region. For example, color histogram differences exhibited good experimental results.

In some configurations, the bounding region reducer 244 may apply two or more of the reduction criteria (e.g., the size criterion 216, the centeredness criterion 214 and/or the color difference criterion 218) in a particular order. For example, the bounding region reducer 244 may apply the centeredness criterion 214 first. Then, the size criterion 216 may be applied to the bounding regions remaining after the reduction based on the centeredness criterion 214. Then, the color difference criterion 218 may be applied to the bounding regions remaining after the reduction based on the size criterion 216. In other configurations, other orders may be utilized (e.g., the size criterion 216, then the centeredness criterion 214, then the color difference criterion 218).

In some configurations, multiple size criteria 216 may be utilized. For example, a first size criterion and a second size criterion may be utilized. In particular, the bounding region reducer 244 may reject any of the plurality of bounding regions that do not meet a centeredness criterion 214 and/or the first size criterion (e.g., that are not close enough to an average size and/or that are not within maximum and/or minimum dimensions). The bounding region reducer 244 may select a bounding region that meets the color difference criterion 218 and/or a second size criterion (e.g., a bounding region with a weighted median size or weighted mean size.). For example, after the centeredness criterion and first size criterion (e.g., centeredness and sizing filters) are applied, the color histogram distance of the inside and outside of each bounding region (e.g., inside the bounding region and outside the bounding region but within the surrounding region) may be computed. The color histogram distance may be utilized to compute a weighted mean bounding region (e.g., bounding box). For example, for each bounding box $B\_i$=some (x, y, w, h), a weight $w\_i$ may be computed. The final bounding box (e.g., the remaining subset) utilized may be $B=w\_1*B\_1+w\_2*B\_2+w\_3*B\_3+ \ldots w\_n*B\_n$. It should be noted that a threshold for the weights (e.g., $w\_i$) may be set such that weights smaller than a weight threshold may be discarded from the calculation.

In some configurations, one or more additional criteria may be utilized. For example, the bounding region reducer 244 may reduce the plurality of bounding regions based on an edge counting criteria.

The processor 226 may process the image based on the subset of the plurality of bounding regions (determined by the bounding region reducer 244, for example). The processor 226 may optionally include and/or implement an object tracker 228, an object recognizer 230, an object remover 232, an image enhancer 234, a cropper 236, a compressor 238 and/or a focuser 250.

In some configurations, the object tracker 228 may track an object in the image based on the subset of the plurality of bounding regions. For example, the object tracker 228 may attempt to track one or more objects in the subset of the plurality of bounding regions. Object tracking may include tracking the one or more objects in a subsequent image (e.g., frame) based on the subset of the plurality of bounding regions. For instance, the object tracker 228 may utilize the image of the object in a bounding region and may attempt to locate the object in a subsequent image.

In some configurations, object tracking may include measuring one or more landmark positions in the bounding region. The object tracker 228 may then predict the location of corresponding landmark positions in a subsequent image (e.g., frame). Additionally or alternatively, the object tracker 228 may search the subsequent image for landmarks that match the landmarks from the region of interest.

In some configurations, the object recognizer 230 may recognize an object based on the subset of the plurality of bounding regions. In some configurations, object recognition may include comparing information (e.g., landmarks, features, etc.) from a bounding region with a database of objects. If the object matches an object in the database (to a degree of probability, for example), then the object is recognized. For example, a face in a bounding region may be compared to a database of known faces. If the face in the bounding region matches a face in the database, the face is recognized. For example, the database may include names of people corresponding to the faces. Accordingly, a face may be recognized to identify a person. Object recognition may be performed on other objects (e.g., eyes, buildings, street signs, people, roads, text, etc.).

In some configurations, the object remover 232 may remove an object from an image based on the subset of the plurality of bounding regions. For example, the object remover 232 may remove an object included in a bounding region by filling in the object area with image patches from areas outside of the bounding region.

In some configurations, the image enhancer 234 may enhance the quality and/or properties of the image based on the subset of the plurality of bounding regions. For example, the image enhancer 234 may perform color correction, color adjustment, white balance, contrast enhancement, de-hazing, red eye removal, sharpness adjustment, noise reduction, lens correction, filtering, image merging, object highlighting and/or image distortion (e.g., warping). Enhancing the image may include modifying pixels inside of and/or outside of the subset of the plurality of bounding region(s).

In some configurations, the cropper 236 may crop the image based on the subset of the plurality of bounding regions. For example, the cropper 236 may crop pixels outside of the bounding region(s) or pixels outside of the bounding region(s) with a margin.

In some configurations, the compressor 238 may compress the image based on the subset of the plurality of bounding regions. For example, the compressor 238 may compress pixels outside of the bounding region(s) or pixels outside of the bounding region(s) with a margin. This may allow for maintaining image fidelity in one or more areas (e.g., bounding regions) that include objects of interest while allowing the remainder of the image to be compressed to reduce the data size of the image.

In some configurations, the focuser 250 may focus the optical system 242 based on the subset of the plurality of bounding regions. For example, the focuser 250 may utilize the image within one or more bounding regions as a reference to focus the optical system 242. This may allow one or more objects within the one or more bounding regions to be in focus.

In some configurations, the processor 226 may include and/or implement a bounding region generation algorithm selector 220. The bounding region generation algorithm selector 220 may select one or more algorithms 212 for generating one or more bounding regions. For example, an algorithm 212 selected by the bounding region generation algorithm selector 220 may be employed by the bounding region generator 210.

The electronic device 208 may determine a selected area (e.g., a selected point) of an image. This may be accomplished as described above. The bounding region generation algorithm selector 220 may select one or more bounding generation algorithms 212 from a plurality of bounding region generation algorithms based on the selected area. In some configurations, the bounding region generation algorithm selector 220 may select between a region grow algorithm and a gradient-based bounding region generation algorithm (e.g., BING). The bounding region generator 210 may then generate one or more bounding regions based on the selected bounding region generation algorithm(s) 212. Selecting the bounding region generation algorithm(s) 212 may be based on a feature vector and a classifier. In some configurations, the feature vector may be based on a color histogram and/or an edge gradient.

One example of approaches for selecting a bounding region generation algorithm is given as follows. The bounding region generation algorithm selector 220 may compute some statistics based on some pixels (e.g., a test image) around (e.g., within and/or in a margin around) a selected area (e.g., selected point). For example, the bounding region generation algorithm selector 220 may compute a color histogram and/or an edge count, etc. These statistics may be utilized to determine when one bounding region generation algorithm 212 works better than another bounding region generation algorithm 212. For example, the bounding region generation algorithm selector 220 may use the statistics to find commonalities and/or differences for situations (e.g., types of images) where a first bounding region generation algorithm 212 (e.g., region grow) performs better and situations where a second bounding region algorithm 212 (e.g., a gradient-based bounding region generation algorithm) performs better. Finding the commonalities and/or differences for these situations may be based on a dataset with known outcomes. K-means or expectation maximum may be an example of an approach that can find commonalities. Support vector machine (SVM) may be an example of an approach that can find distinguishing differences. Based on the commonalities and/or differences learned from the dataset, the bounding region generation algorithm selector 220 may compute the statistics on a test image with the selected area (e.g., initial location). The bounding region generation algorithm selector 220 may determine which bounding region generation algorithm 212 to use based on which statistics best fit (with nearest neighbors or linear separation as an example).

The memory 252 may store instructions and/or data. The processor may access (e.g., read from and/or write to) the memory 252. Examples of instructions and/or data that may be stored by the memory 252 may include image data, bounding region data (e.g., location and/or size of one or more bounding regions), centeredness (e.g., distances) of one or more bounding regions, color distance (e.g., histogram distance) corresponding to one or more bounding regions, bounding region generator algorithm instructions, landmarks, color histogram, edge count, feature vector(s), etc.

Figure 3:
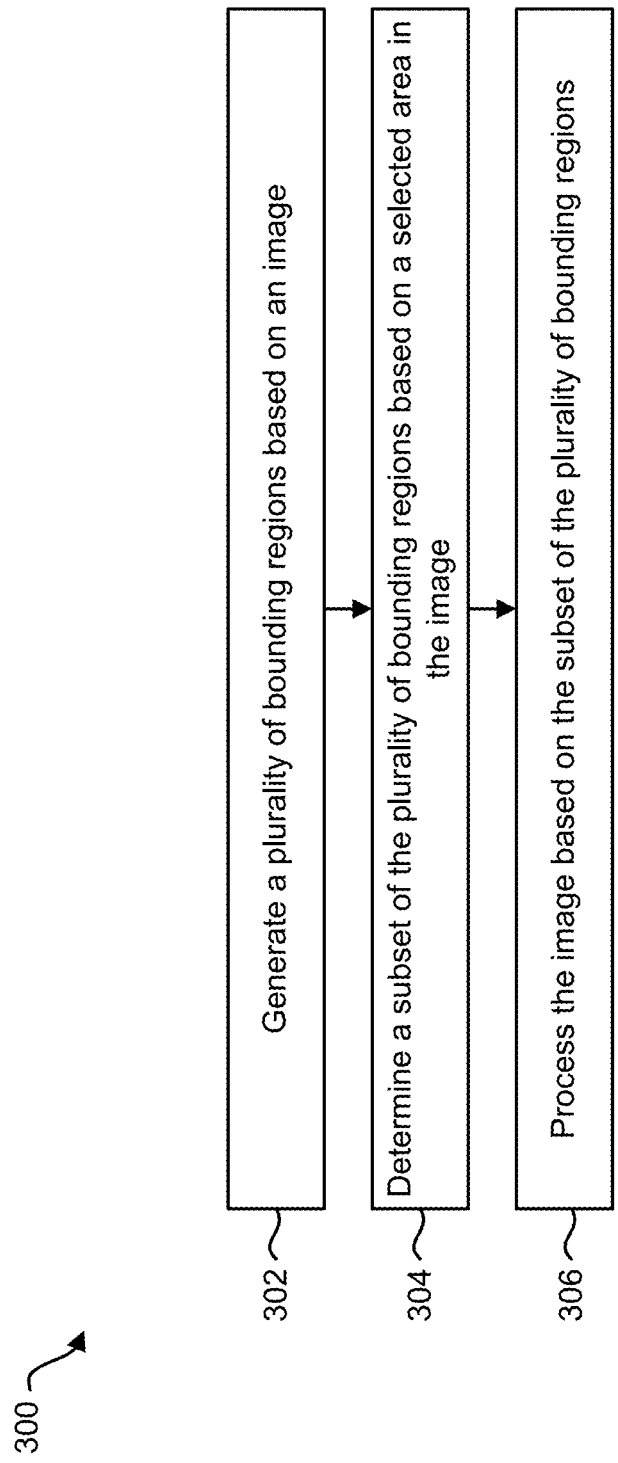
FIG. 3 is a flow diagram illustrating an example of one configuration of a method for reducing a plurality of bounding regions.

FIG. 3 is a flow diagram illustrating an example of one configuration of a method 300 for reducing a plurality of bounding regions. The method 300 may be performed by the electronic device 208 described in connection with FIG. 2.

The electronic device 208 may generate 302 a plurality of bounding regions based on an image. This may be accomplished as described in connection with one or more of FIGS. 1-2. For example, the electronic device 208 may generate a plurality of bounding regions with a region grow algorithm and/or a gradient-based bounding region generation algorithm. In some configurations, the electronic device may generate the plurality of bounding regions with region grow as described in connection with one or more of FIGS. 13 and 15.

The electronic device 208 may determine 304 a subset of the plurality of bounding regions based on a selected area in the image and/or at least one criterion. This may be accomplished as described in connection with FIG. 2. For example, the electronic device 208 may apply one or more criteria (e.g., a centeredness criterion, a size criterion and/or a color difference criterion) to reduce the plurality of bounding regions.

In some configurations, determining the subset of the plurality of bounding regions may be based on a centeredness of each of the plurality of bounding regions relative to the selected area. For example, one or more bounding regions that do not meet a centeredness criterion (e.g., that have a center distance less than a center distance threshold) may be rejected (e.g., eliminated, removed, etc.) from the plurality of bounding regions.

In some configurations, determining the subset of the plurality of bounding regions may be based on a size criterion. For example, one or more bounding regions that do not meet a size criterion (e.g., that are not close enough to an average size (e.g., mean, median, etc.) of the plurality of bounding regions) may be rejected (e.g., eliminated, removed, etc.) from the plurality of bounding regions.

In some configurations, determining the subset of the plurality of bounding regions may be based on a color difference criterion. For example, one or more bounding regions that do not meet a color difference criterion (e.g., that do not have the highest color distance of the plurality of bounding regions) may be rejected (e.g., eliminated, removed, etc.) from the plurality of bounding regions. In some configurations, the color distance of a bounding region may be based on a comparison between a color histogram of (e.g., within) the bounding region and a color histogram of a surrounding region (e.g., outside of the bounding region and within a surrounding boundary). It should be noted that in configurations with multiple criteria, the multiple criteria may be applied in a sequence or may be applied in parallel.

The electronic device 208 may process 306 the image based on the subset of the plurality of bounding regions. This may be accomplished as described in connection with FIG. 2. For example, the electronic device 208 may recognize an object, track an object, focus the optical system 242, remove an object, enhance an image, crop an image and/or compress an image. Other operations may be performed.

Figure 4:
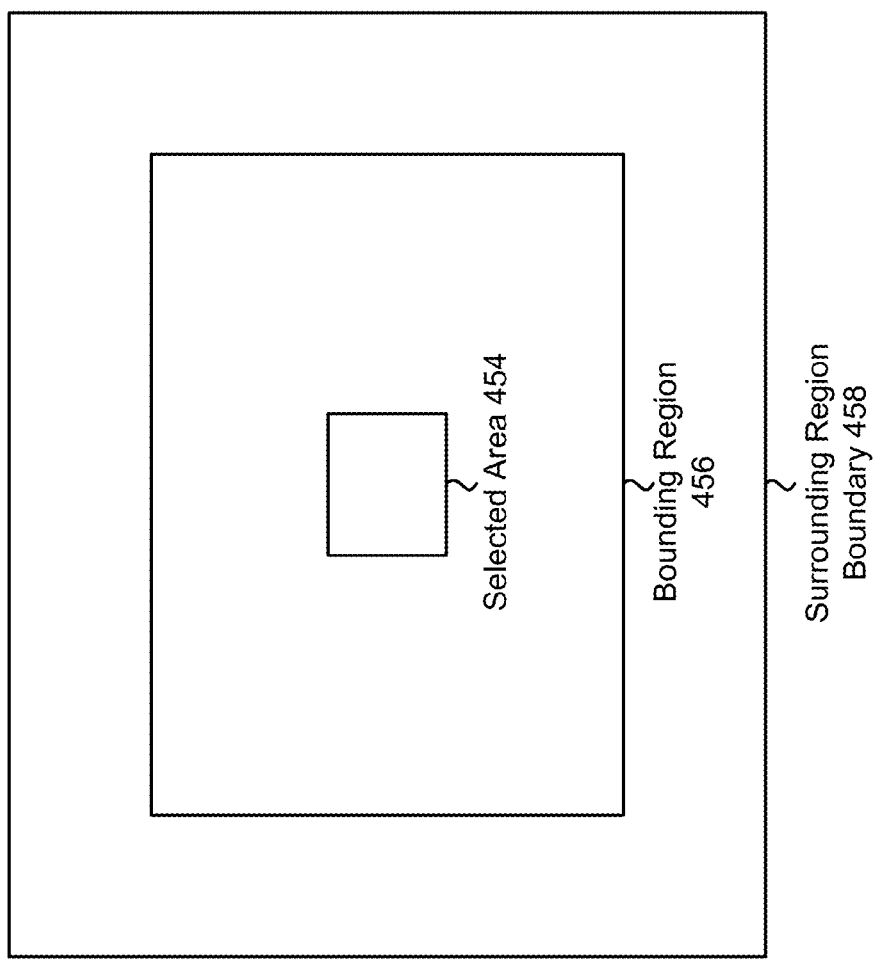
FIG. 4 is a diagram illustrating an example of a selected area, a bounding region and a surrounding region boundary.

FIG. 4 is a diagram illustrating an example of a selected area 454, a bounding region 456 and a surrounding region boundary 458. The electronic device 208 may determine, generate and/or utilize one or more of the selected area 454, the bounding region 456 and the surrounding region boundary 458. As described above, a selected area 454 may be determined based on a received input (e.g., a touch point, a mouse click, etc.) or may be automatically determined. As illustrated in FIG. 4, the selected area 454 may be a group of pixels. For example, a selected area 454 may include a group of pixels corresponding to the area of a touchscreen input. The bounding region 456 may be generated based on a bounding region algorithm (e.g., region grow, gradient-based bounding region generation algorithm, etc.). For example, the bounding region 456 may be one of a plurality of bounding regions generated. In some configurations, the bounding region 456 may be generated based on the selected area 454. The surrounding region (e.g., surrounding region boundary 458) may be determined based on the bounding region 456. For example, the surrounding region boundary may be an amount larger than the bounding region 456. For instance, the surrounding region boundary 458 may have proportionately larger dimensions than the bounding region 456 or may be a fixed amount larger than the bounding region 456. In one example, the surrounding region boundary 458 may have a height that is 20% larger than the height of the bounding region 456 and a width that is 20% larger than the width of the bounding region 456.

In the example illustrated in FIG. 4, the bounding region 456 includes the selected area 454. As described above, one or more bounding regions that do not meet a centeredness criterion and/or a size criterion may be rejected in some configurations.

Additionally or alternatively, one or more bounding regions that do not meet a color difference criterion may be rejected. In some configurations, the color distance of a bounding region 456 may be determined by computing a color histogram based on pixels within the bounding region 456 and computing a color histogram based on pixels in the surrounding region (e.g., between the bounding region 456 and the surrounding region boundary 458). The color distance may then be computed by comparing the color histograms. For example, a Chi-Squared distance (between the color histograms, for example) may be computed to produce the color distance. In some configurations, the bounding region with the largest color distance may meet the color difference criterion. Any other bounding regions may be rejected.

Accordingly, FIG. 4 illustrates boundaries with the centeredness criterion and the outer pixel criterion (e.g., color difference criterion). It should be noted that the surrounding region with dimensions that are 20% greater than a bounding box width and height is just one example. Other proportions and/or amounts may be used.

Figure 5:
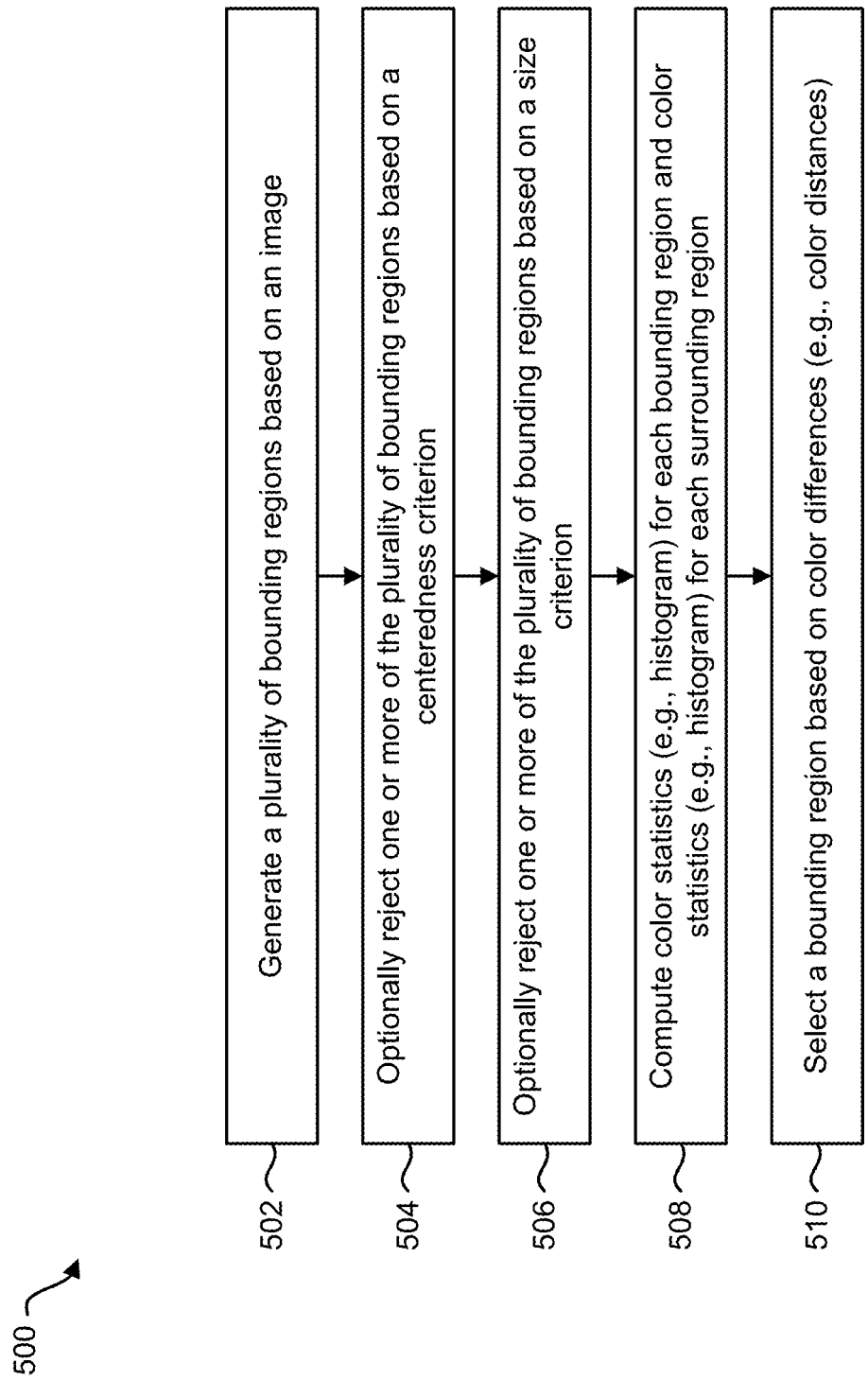
FIG. 5 is a flow diagram illustrating an example of a more specific configuration of a method for reducing a plurality of bounding regions.

FIG. 5 is a flow diagram illustrating an example of a more specific configuration of a method 500 for reducing a plurality of bounding regions. The method 500 may be performed by the electronic device 208 described in connection with FIG. 2.

The electronic device 208 may generate 502 a plurality of bounding regions based on an image. This may be accomplished as described in connection with one or more of FIGS. 1-4. For example, the electronic device 208 may generate a plurality of bounding regions with a region grow algorithm and/or a gradient-based bounding region generation algorithm.

The electronic device 208 may optionally reject 504 one or more of the plurality of bounding regions based on a centeredness criterion. This may be accomplished as described in connection with one or more of FIGS. 2-4. For example, the electronic device 208 may eliminate bounding region candidates by determining and throwing out region candidates that are not close to the center of the regions. Additionally or alternatively, rejecting 504 one or more of the plurality of bounding regions based on the centeredness criterion may be based on the selected area (e.g., a received touch input). In some configurations, the centeredness criterion may be applied first.

The electronic device 208 may optionally reject 506 one or more of the plurality of bounding regions based on a size criterion. This may be accomplished as described in connection with one or more of FIGS. 2-4. For example, one or more bounding regions that are not close enough to an average size (e.g., mean, median, etc.) of the plurality of bounding regions may be rejected.

The electronic device 208 may compute 508 color statistics (e.g., a color histogram) for each bounding region and color statistics (e.g., a color histogram) for each surrounding region. This may be accomplished as described in connection with one or more of FIGS. 2-4. For example, color statistics of the foreground (e.g., bounding region) and color statistics of the background (e.g., surrounding region) may be determined for each bounding region. It should be noted that a color histogram may indicate a color composition of a region (e.g., bounding region, surrounding region, etc.). For example, the color histogram may indicate how much of a color (e.g., pixel color value) is in a region and/or the density of colors over a spectrum of colors. Computing 508 color statistics may include, for each bounding region, determining a surrounding region of pixels and collecting a color histogram of both the region outside of the bounding region and inside of the bounding region. The electronic device 208 may also compute a histogram distance (e.g., Chi-Squared). This may determine and/or indicate how different the background is from the bounding region. The larger the histogram distance, the greater the difference between the bounding region and the surrounding region (e.g., background).

The electronic device 208 may select 510 a bounding region based on color differences (e.g., color distances). To select 510 just one bounding region (e.g., bounding box), the electronic device 208 may use the distance (e.g., color distance) computed for each bounding region. In some configurations, the selected 510 bounding region may be the bounding region with the largest distance. Alternatively, the electronic device may compute 508 the weighted mean (or median) of all the bounding regions using the distance (e.g., color distance) with weights. The weighted mean of all the (remaining) bounding regions may be determined as described above. The electronic device 208 may accordingly provide a bounding region (e.g., a bounding box including an object).

Figure 6:
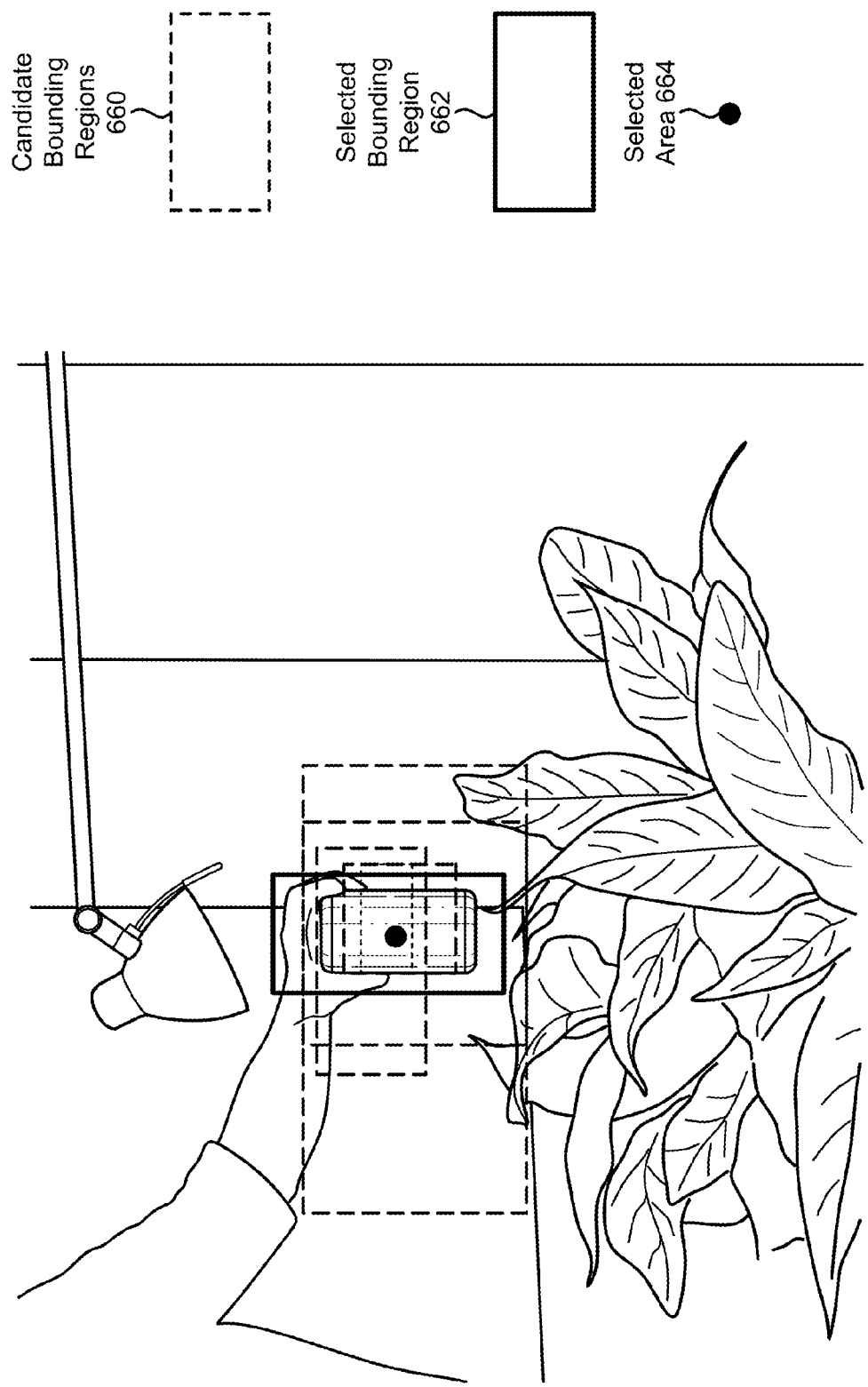
FIG. 6 is an image illustrating an example of a selected area, candidate bounding regions and a selected bounding region in accordance with the systems and methods disclosed herein.

FIG. 6 is an image illustrating an example of a selected area 664, candidate bounding regions 660 and a selected bounding region 662 in accordance with the systems and methods disclosed herein. In particular, the dot represents a selected area 664 in an image. For example, the soda can depicted in the image may be an object of interest. A user may touch the image of the soda can on a touchscreen. The electronic device 208 may determine the selected area 664 based on the touch area. Then, the electronic device 208 may generate multiple candidate bounding regions. For example, the rectangles with dashed lines may be candidate bounding regions 660 from a general object detector (e.g., bounding region generator 210). The selected bounding region 662 may be a result of the systems and methods disclosed herein. For example, the selected bounding region 662 may be selected from the candidate bounding regions 660. For instance, the electronic device 208 may reduce the candidate bounding regions 660 until only the selected bounding region 662 remains. This may be accomplished as described above in connection with one or more of FIGS. 1-5.

General object detection (as opposed to specific object detection that involves detecting specific (e.g., predetermined) objects like cars, pedestrians, etc., for example) is a relatively new field with much work to explore. Some applications that utilize an initial location (e.g., a selected area) may use a similarity-based region grow approach to find a specified object. Some region grow approaches may be unable to search through scale. In the image in FIG. 6, for example, some region grow approaches may not be able to discriminate between whether a soda can or lettering on the soda can is selected. General object detectors may be able to provide bounding region candidates of all scales, allowing the ability to search every possible object size. Some configurations of the systems and methods disclosed herein may combine a selected area (e.g., an initial location input) with multi-scale detectors. Combining a selected area with a multi-scale detector may be beneficial, by providing improved speed and/or accuracy.

Figure 7:
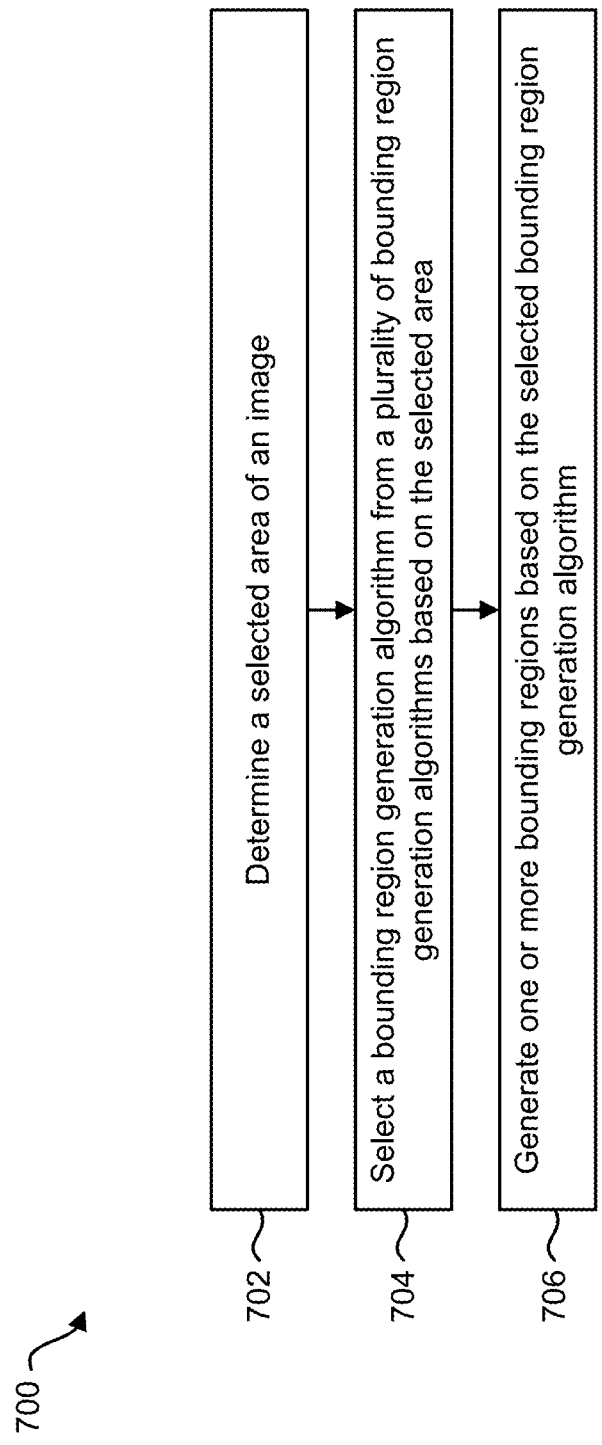
FIG. 7 is a flow diagram illustrating one configuration of a method for selecting a bounding region generation algorithm.

FIG. 7 is a flow diagram illustrating one configuration of a method 700 for selecting a bounding region generation algorithm. The method 700 may be performed by the electronic device 208. The electronic device 208 may determine 702 a selected area of an image. This may be accomplished as described above in connection with one or more of FIGS. 1-6. For example, the electronic device 208 may receive and/or detect a touch input, mouse click, gesture, etc. The electronic device 208 may determine the selected area based on the received and/or detected input. For example, the electronic device 208 may determine a correspondence between the input and one or more pixels in an image. In some configurations, a detected area of a touch sensor (e.g., touch screen) may be mapped to one or more pixels of an image. Alternatively, the electronic device 208 may determine the selected area without detecting a user input.

The electronic device 208 may select 704 a bounding region generation algorithm 212 from a plurality of bounding region generation algorithms 212 based on the selected area. This may be accomplished as described above in connection with FIG. 2.

In some configurations, the electronic device 208 may compute some statistics based on pixels in and/or around a selected area (from a dataset with known outcomes, for instance). Examples of statistics may include a color histogram and an edge count. The statistics may be utilized to find commonalities and/or differences in situations where one bounding region generation algorithm performs better than one or more other bounding region generation algorithms. For example, K-means or expectation maximum may be utilized to find commonalities and/or SVM may be utilized to find differences. The commonalities and/or differences may be used to generate a decision rule (e.g., a classifier) that separates some situations (e.g., types of images, images with particular statistics and/or features, etc.) where one bounding region generation algorithm performs better from other situations (e.g., other types of images) where another bounding region generation algorithm performs better. Performance may be measured in terms of accuracy and/or speed.

Based on the selected area (e.g., pixels in and/or around the selected area), the electronic device 208 may compute statistics (e.g., color histogram, edge count, etc.). The decision rule (e.g., classifier) may be applied to the statistics. For example, if the statistics (corresponding to the selected area in the current image, for instance) are more similar to statistics for situations in which a first bounding region generation algorithm exhibits better performance, the electronic device 208 may select the first bounding region generation algorithm. However, if the statistics are more similar to statistics for situations in which a second bounding region generation algorithm exhibits better performance, the electronic device 208 may select the second bounding region generation algorithm.

The electronic device 208 may generate 706 one or more bounding regions based on the selected bounding region generation algorithm. For example, the electronic device 208 may generate one or more bounding regions based on a multi-scale algorithm (e.g., a gradient-based bounding region generation algorithm or BING) if the multi-scale algorithm has been selected 704 or a region grow algorithm if the region grow algorithm has been selected 704.

Figure 8:
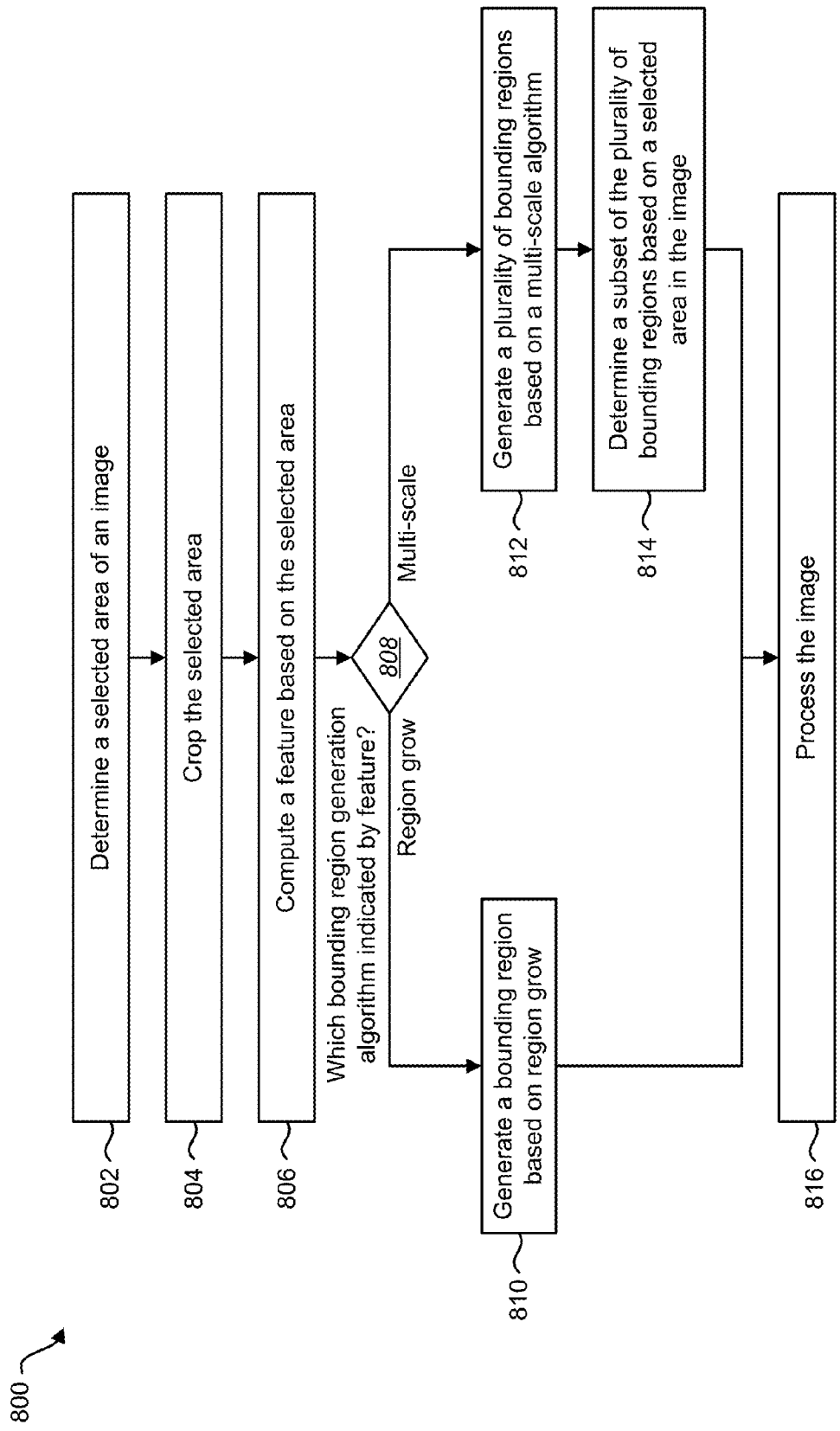
FIG. 8 is a flow diagram illustrating an example of a more specific configuration of a method for selecting a bounding region generation algorithm.

FIG. 8 is a flow diagram illustrating an example of a more specific configuration of a method 800 for selecting a bounding region generation algorithm. In particular, FIG. 8 illustrates an example of selecting between a region grow algorithm (e.g., an approach for finding objects based on color similarity around an initial point) and a multi-scale algorithm (e.g., gradient-based bounding region generation algorithm or BING). The method 800 may be performed by the electronic device 208. The electronic device 208 may determine a selected area of an image. This may be accomplished as described in connection with one or more of FIGS. 1-7.

The electronic device 208 may crop 804 the selected area. For example, the electronic device 208 may discard pixels outside of the selected area or pixels outside of an area larger than the selected area. For instance, the electronic device 208 may preserve the selected area or may preserve the selected area with an additional margin (e.g., 20% more than the selected area, 100% more than the selected area, a predetermined size of a region surrounding the selected area, etc.).

The electronic device 208 may compute 806 a feature based on the selected area. For example, the electronic device 208 may collect image statistics of the selected area and/or of the margin around the selected area. As described above, the electronic device 208 may generate a decision rule (e.g., may train a descriptor or classifier) that determines which algorithm performs better for images with certain characteristics (e.g., statistics).

The electronic device 208 may determine 808 which bounding region generation algorithm is indicated by the feature (e.g., statistics). This may be accomplished as described in connection with one or more of FIGS. 2 and 7. For example, if the feature is more similar to features of images where the region grow algorithm performs better, then the electronic device 208 may select the region grow algorithm. If the feature is more similar to features of images where the multi-scale algorithm (e.g., gradient-based bounding region generation algorithm) performs better, then the electronic device 208 may select the multi-scale algorithm. The selected algorithm may be applied.

In some configurations, the electronic device 208 may compute some statistics (e.g., color histogram and/or edge count, etc.) based on some pixels (e.g., a test image) around (e.g., within and/or in a margin around) a selected area (e.g., selected point). This may be performed for a dataset with known outcomes. These statistics may be utilized to generate a decision rule (e.g., to train a classifier and/or a descriptor) that selects which bounding region generation algorithm (e.g., region grow or multi-scale) performs better for images with particular characteristics (e.g., statistics). For example, commonalities and/or differences may be found with one or more of K-means, expectation maximum and SVM. The electronic device 208 may apply the decision rule (e.g., classifier, descriptor, etc.) to the statistics of the current selected area (using nearest neighbors and/or linear separation, for example, which may indicate which situation the statistics fit best). This may produce a decision whether the region grow algorithm or the multi-scale algorithm would likely offer better performance.

If the selected bounding region algorithm is the region grow algorithm, the electronic device 208 may generate 810 a bounding region (e.g., object bounding box) based on the region grow algorithm. This may be accomplished as described in connection with one or more of FIGS. 2, 13 and 15. The electronic device 208 may process 816 the image based on the bounding region. For example, the electronic device 208 may process 816 the image as described above in connection with one or more of FIGS. 2-3. It should be noted that in some configurations, the region grow algorithm may produce only one bounding region (for each object, for example). In these configurations, the electronic device 208 may directly process 816 the image based on the bounding region. In other configurations, the region grow algorithm may produce a plurality of bounding regions (for each object, for example). In these configurations, the electronic device 208 may optionally determine 814 a subset (e.g., one) of the plurality of bounding regions and process 816 the image based on the subset of the plurality of bounding regions.

If the selected bounding region algorithm is the multi-scale algorithm, the electronic device 208 may generate 812 a plurality of bounding regions (e.g., bounding region candidates) based on the multi-scale algorithm. This may accomplished as described in connection with one or more of FIGS. 1-6.

The electronic device 208 may determine 814 a subset (e.g., one) of the plurality of bounding regions based on the selected area in the image. This may be accomplished as described above in connection with one or more of FIGS. 2-6. For example, the electronic device 208 may determine a single object bounding box from a plurality of bounding boxes.

The electronic device 208 may process 816 the image based on the bounding region. For example, the electronic device 208 may process 816 the image as described above in connection with one or more of FIGS. 2-3.

It should be noted that some kinds of bounding region generation algorithms may perform better than others for different images. For example, a multi-scale algorithm or a gradient-based bounding region generation algorithm with bounding region reduction as described in accordance with the systems and method disclosed herein may often perform better than the region grow algorithm. In some situations (for single-color objects, for example), however, the region grow algorithm performs very well. Otherwise, a multi-scale algorithm may offer greater accuracy and stability. Accordingly, the ability to select a bounding region generation algorithm may offer greater flexibility and improved performance by selecting the bounding region generation algorithm that may likely perform better for a particular image.

Figure 9:
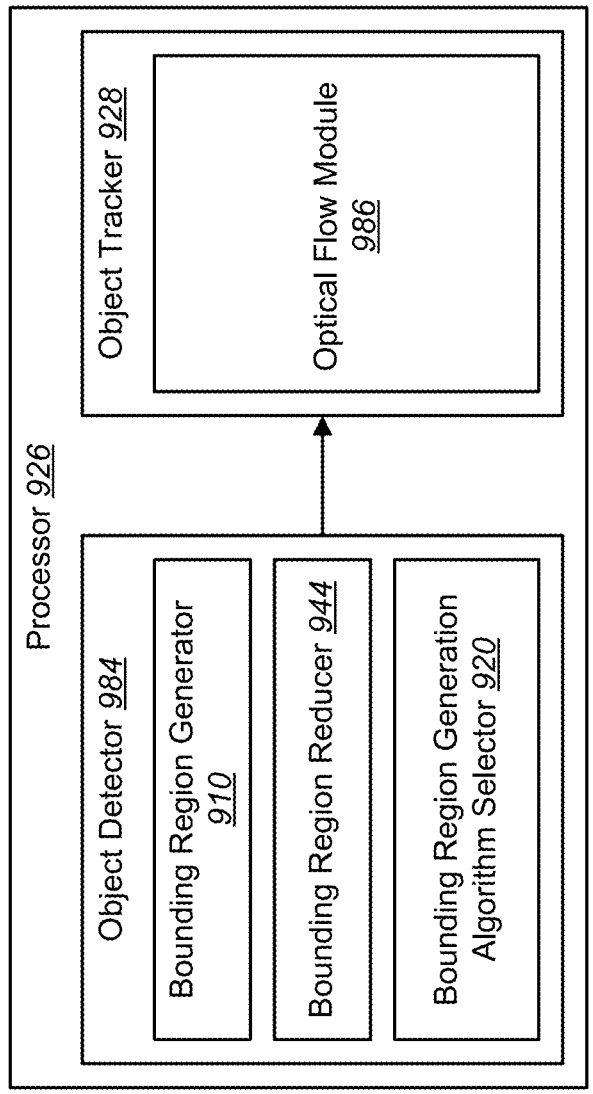
FIG. 9 is a block diagram illustrating an example of a processor in which systems and methods for selecting a bounding region generation algorithm and/or for reducing a plurality of bounding regions may be implemented.

FIG. 9 is a block diagram illustrating an example of a processor 926 in which systems and methods for selecting a bounding region generation algorithm and/or for reducing a plurality of bounding regions may be implemented. The processor 926 may be one example of the processor 226 described in connection with FIG. 2. For example, the processor 926 may be included within an electronic device (e.g., electronic device 208).

The processor 926 may include and/or implement an object detector 984 and/or an object tracker 928. As illustrated in FIG. 9, the object detector 984 may include a bounding region generator 910, a bounding region reducer 944 and/or a bounding region generation algorithm selector 920. The bounding region generator 910, the bounding region reducer 944 and the bounding region generation algorithm selector 920 may be respective examples of the bounding region generator 210, the bounding region reducer 244 and the bounding region generation algorithm selector 220 described in connection with FIG. 2.

The object detector 984 may detect an object in an image (e.g., in a video frame). For example, the object detector 984 may produce a bounding region that includes an object. In some configurations, the bounding region generation algorithm selector 920 may optionally select a bounding region generation algorithm as described above in connection with one or more of FIGS. 2 and 7-8. The bounding region generator 910 may generate a plurality of bounding regions (when a bounding region generation algorithm that produces multiple bounding regions is selected, for example). For example, the bounding region generator 910 may generate a plurality of bounding regions. This may be accomplished as described in connection with one or more of FIGS. 1-8. The bounding region reducer 944 may determine a subset (e.g., one or more) of the plurality of bounding regions. This may be accomplished as described in connection with one or more of FIGS. 2-6 and 8.

The subset of the plurality of bounding regions may be provided to the object tracker 928. The object tracker 928 may be an example of the object tracker 228 described in connection with FIG. 2. In some configurations, the object tracker 928 may be a motion tracker having an optical flow module 986.

The object tracker 928 may be used to perform motion-based tracking on a current video frame (N). For example, a previous video frame (N−1) and a current video frame (N) may be received (e.g., by the electronic device). The previous video frame (N−1) may immediately precede a current video frame (N) in a sequence of video frames. Additional video frames may be obtained and processed by the processor 926. The previous video frame (N−1) may be provided to the object tracker 928. Further, a memory (e.g., memory 252, not shown in FIG. 9) may store data associated with the previous video frame (N−1), referred to herein as a captured previous video frame. In some configurations, the memory may obtain information about the previous video frame (N−1) directly from the electronic device (e.g., from the camera). The memory may also obtain tracking results about the previous video frame (N−1), which may specify where an object was tracked and/or detected in the previous video frame (N−1). This information about the previous video frame (N−1) or other previously captured video frames may be stored in the memory.

The object tracker 928 may subsequently receive a current video frame (N) in a sequence of video frames. The motion tracker 928 may compare the current video frame (N) to the previous video frame (N−1) (e.g., using information provided from the memory). The motion tracker 928 may track motion of an object on the current video frame (N) using an optical flow module 986. The optical flow module 986 may include hardware and/or software for performing motion-based tracking of an object on a current video frame (N). By comparing the previous video frame (N−1) and the current video frame (N), the motion tracker 928 may determine a tracking confidence value associated with the likelihood that a target object is in the current video frame (N). In one example, the tracking confidence value is a real number (e.g., between 0 and 1) based on a percentage of certainty that the target object is within the current video frame (N) or a window within the current video frame (N).

As illustrated in FIG. 9, one or more of the illustrated components may be optionally implemented by a processor 926. For example, the object detector 984 and the object tracker 928 may be implemented by a processor 926. In some configurations, different processors may be used to implement different components (e.g., one processor may implement the object tracker 928 and another processor may be used to implement the object detector 984.

Figure 10:
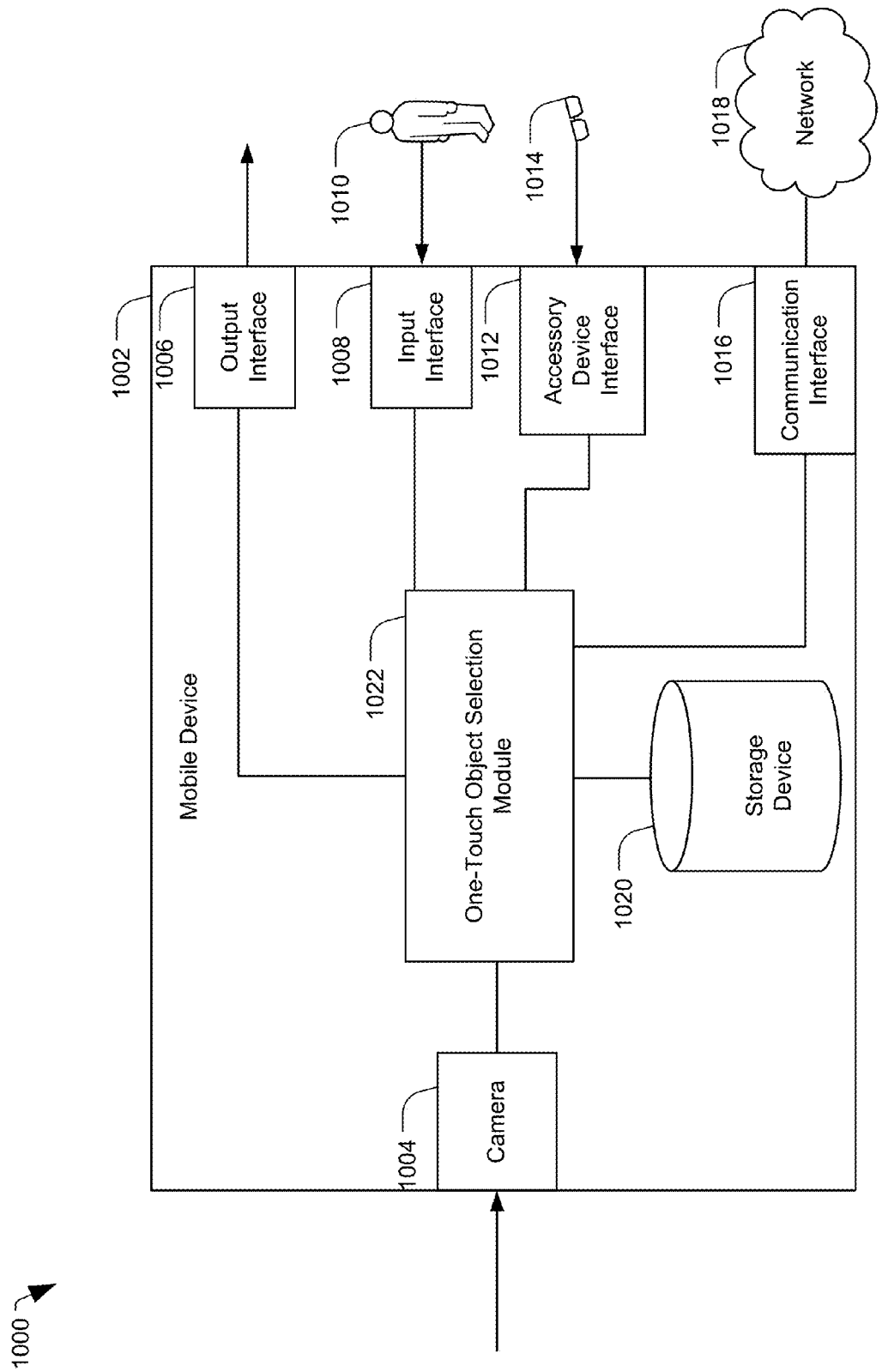
FIG. 10 is a block diagram illustrating one configuration of a system that is operable to perform one-touch object selection.

FIG. 10 is a block diagram illustrating one configuration of a system 1000 that is operable to perform one-touch object selection. The system 1000 includes a mobile device 1002. The mobile device 1002 may be one example of the electronic device 208 described in connection with FIG. 2. The mobile device 1002 may be a mobile phone, a music player, a video player, an entertainment unit, a navigation device, a communications device, a personal digital assistant (PDA), a computer, or any other mobile computing device. The mobile device 1002 includes a camera 1004. The camera 1004 may be configured to capture and output still images and videos. The mobile device 1002 includes an output interface 1006. The output interface 1006 may be configured to communicate with a display device, such as a liquid crystal display (LCD), a light emitting diode (LED) display, or any other display device. In a particular configuration, the output interface 1006 outputs a graphical user interface (GUI). The mobile device 1002 further includes an input interface 1008. The input interface 1008 may include a touch screen, any other type of input device, or any combination thereof. In particular configurations, the input interface 1008 may be configured to receive input from a user 1010 (e.g., input responsive to a GUI output by the output interface 1006).

The mobile device 1002 may further include an accessory device interface 1012. In a particular configuration, the accessory device interface 1012 receives input from an accessory device 1014. In a particular configuration, the accessory device 1014 includes a camera. The input received from the accessory device 1014 may include image or video data. In a particular configuration, the accessory device 1014 may be embedded in a user wearable accessory, such as eyeglasses or jewelry.

The mobile device 1002 may further include a communication interface 1016 configured to communicate with a network 1018. The communication interface 1016 may include an Ethernet interface, an 802.11 (Wi-Fi) interface, a cellular communication interface, for example, a Long Term Evolution (LTE) interface, a Code Division Multiple Access (CDMA) interface, a Time Division Multiple Access (TDMA) interface, an 802.16 (WiMAX) interface, any other wired or wireless network interface, or any combination thereof.

The mobile device 1002 further includes a storage device 1020. The storage device 1020 may include a solid state drive, a hard disk drive, an optical drive, or any other type of computer readable storage medium or device. The storage device 1020 may store images and videos (e.g., images and videos that are captured by the camera 1004, downloaded by the mobile device 1002 via the communication interface 1016, etc.). In some configurations, the storage device 1020 may be one example of the memory 252 described in connection with FIG. 2.

A one-touch object selection module 1022 may be implemented in a combination of hardware and software (e.g., instructions stored in a memory of the mobile device 1002 that are executable by a processor of the mobile device 1002). Alternatively, all or part of the one-touch object selection module 1022 may be implemented in hardware. The one-touch object selection module 1022 may receive, via user input, selections of one or more objects included (e.g., depicted) in an image or a frame of video. The one-touch object selection module 1022 may be configured to perform object selection in response to a one-touch input received from the user 1010. Examples of operation of the system 1000 are further described with reference to FIGS. 11-17.

Figure 11:
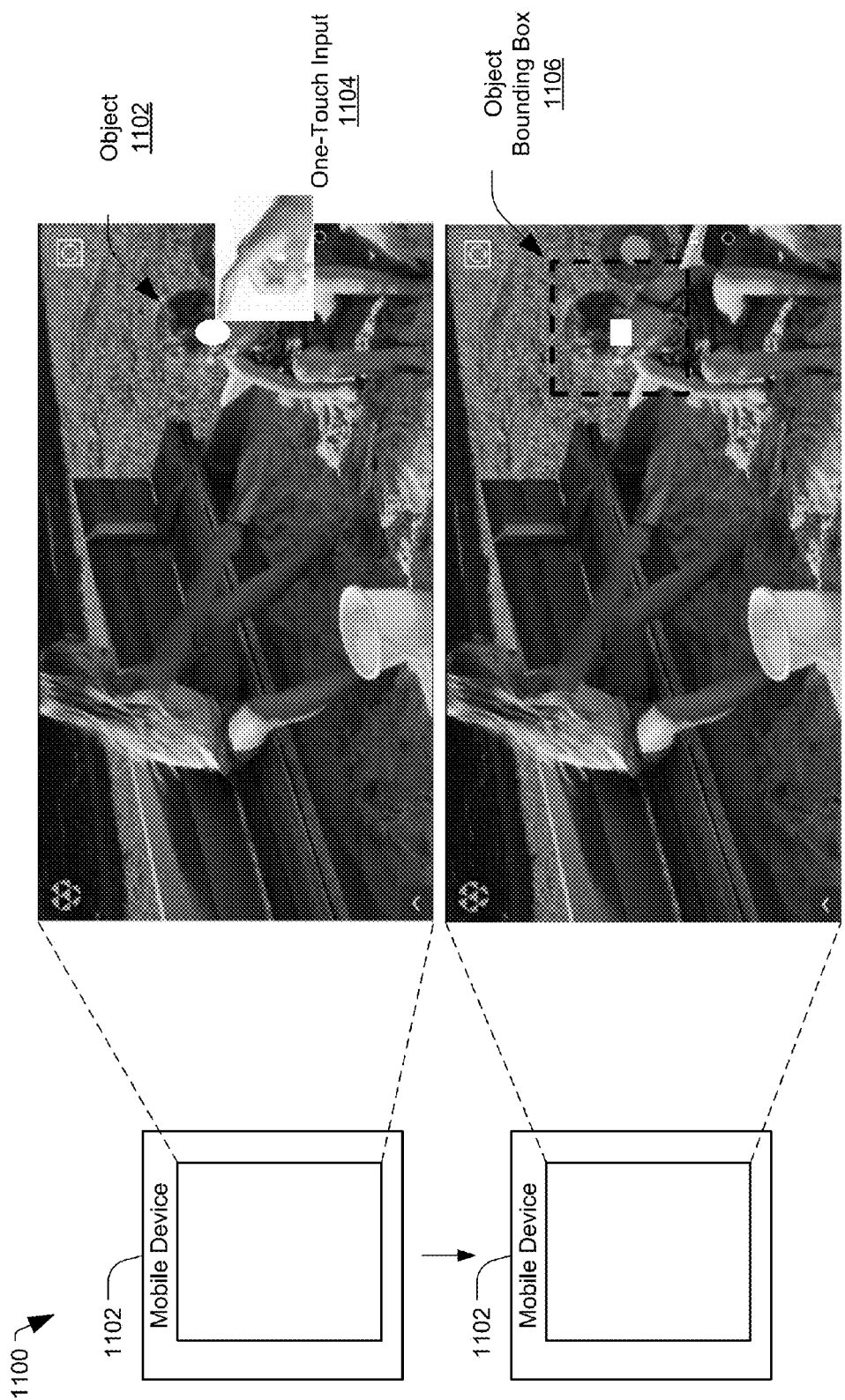
FIG. 11 is a diagram illustrating one example of a method of one-touch object selection.

FIG. 11 is a diagram illustrating one example of a method 1100 of one-touch object selection. FIG. 11 illustrates that a user may select an object 1102 via a one-touch input 1104, and an object bounding box 1106 may be identified responsive to the one-touch input 1104.

One-touch object selection may be useful in various computer vision (CV) applications. As an illustrative, non-limiting example, a multi-touch input to define a bounding box may be cumbersome or imprecise in an object tracking application. In order to define a bounding box using a multi-touch input, the user may cross an object by drawing a line using a one finger draw or a two finger draw. Such a bounding box may be imprecise. For example, the user may select more or less of the image for tracking than desired. Further, in some cases it may be difficult for the user to define a bounding box around a moving object (e.g., a fast moving car) or around a small object (e.g., a particular soccer player on a soccer field). Accordingly, generating the object bounding box 1106 to select the object 1102 in response to the one-touch input 1104 may provide an improved user experience.

Figure 12:
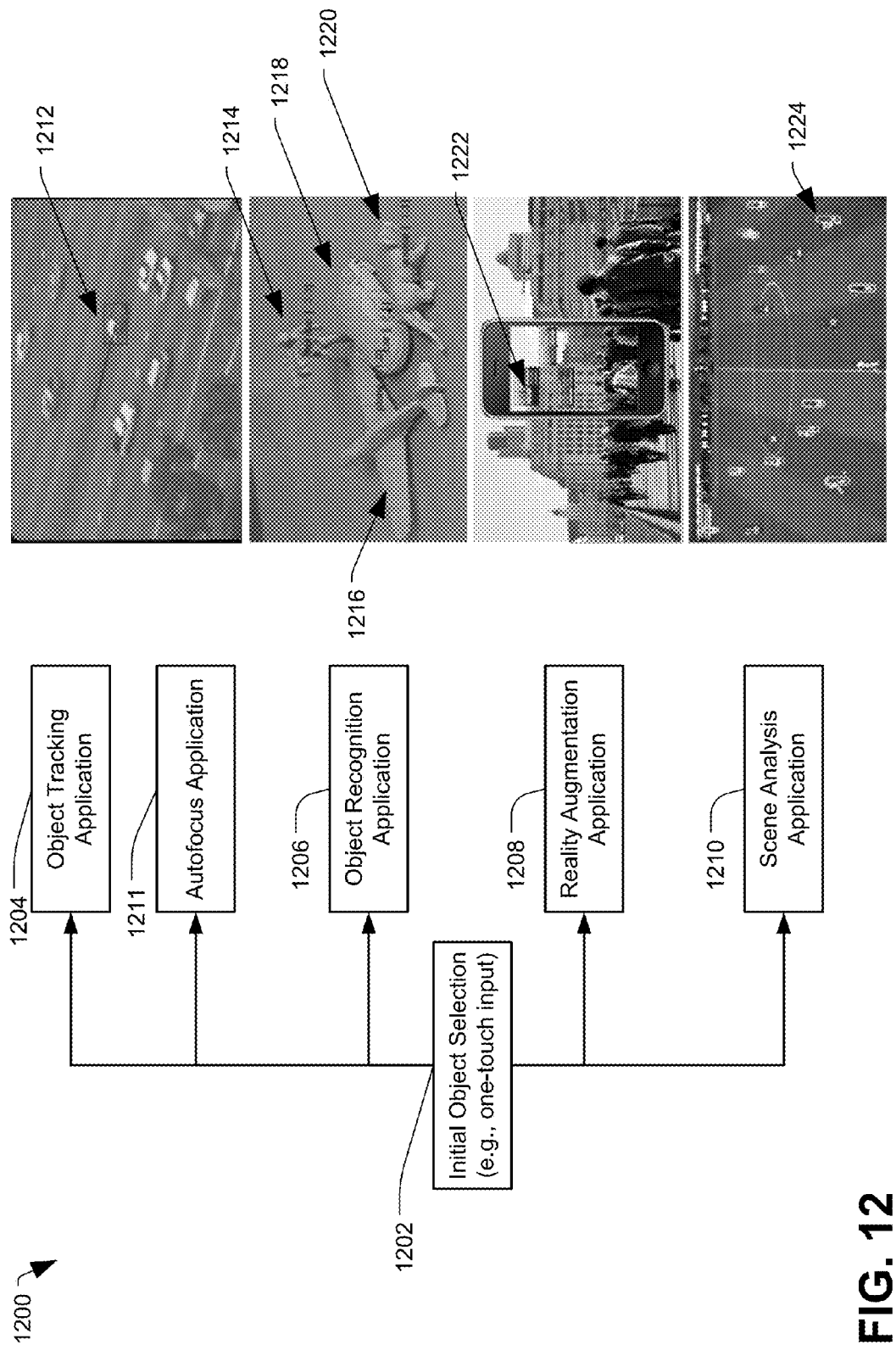
FIG. 12 is a diagram illustrating multiple example computer vision (CV) use cases associated with object selection.

FIG. 12 is a diagram illustrating multiple example computer vision (CV) use cases 1200 associated with object selection (e.g., in response to a one-touch input). For example, FIG. 12 illustrates that an initial object selection 1202 may be associated with various applications. For example, the initial object selection 1202 may include a one-touch input on a touch screen (e.g., the one-touch input 1104 illustrated in FIG. 11). However, it will be appreciated that there may be multiple ways for a user to make an initial selection of an object. Examples of alternative user inputs may include one or more gestures, one or more eye movements, one or more voice commands, or a combination thereof. Alternatively, various CV-based automatic object detection mechanisms may be employed for initial object selection.

FIG. 12 further illustrates that the initial object selection 1202 may be useful in various applications, including an object tracking application 1204, an object recognition application 1206, a reality augmentation application 1208, a scene analysis application 1210, or an autofocus application 1211, among other alternatives. In the example image associated with the object tracking application 1204, the object being tracked includes a moving car 1212. Additionally or alternatively, in the example image associated with the autofocus application 1211, the object being focused includes the car 1212. In some configurations, autofocus may be performed in conjunction with tracking or independent of tracking. For instance, a camera lens focus may be maintained on an object as the object moves. In the example image associated with the object recognition application 1206, four objects are identified, including a human 1214, a plane 1216, a car 1218, and an animal 1220. In the example image associated with the reality augmentation application 1208, information 1222 associated with a particular location is provided (e.g., an address of a building or an indication that a monument is located near the building). In the example image associated with the scene analysis application 1210, individual soccer players on a soccer field may be identified by a different bounding region 1224.

Figure 13:
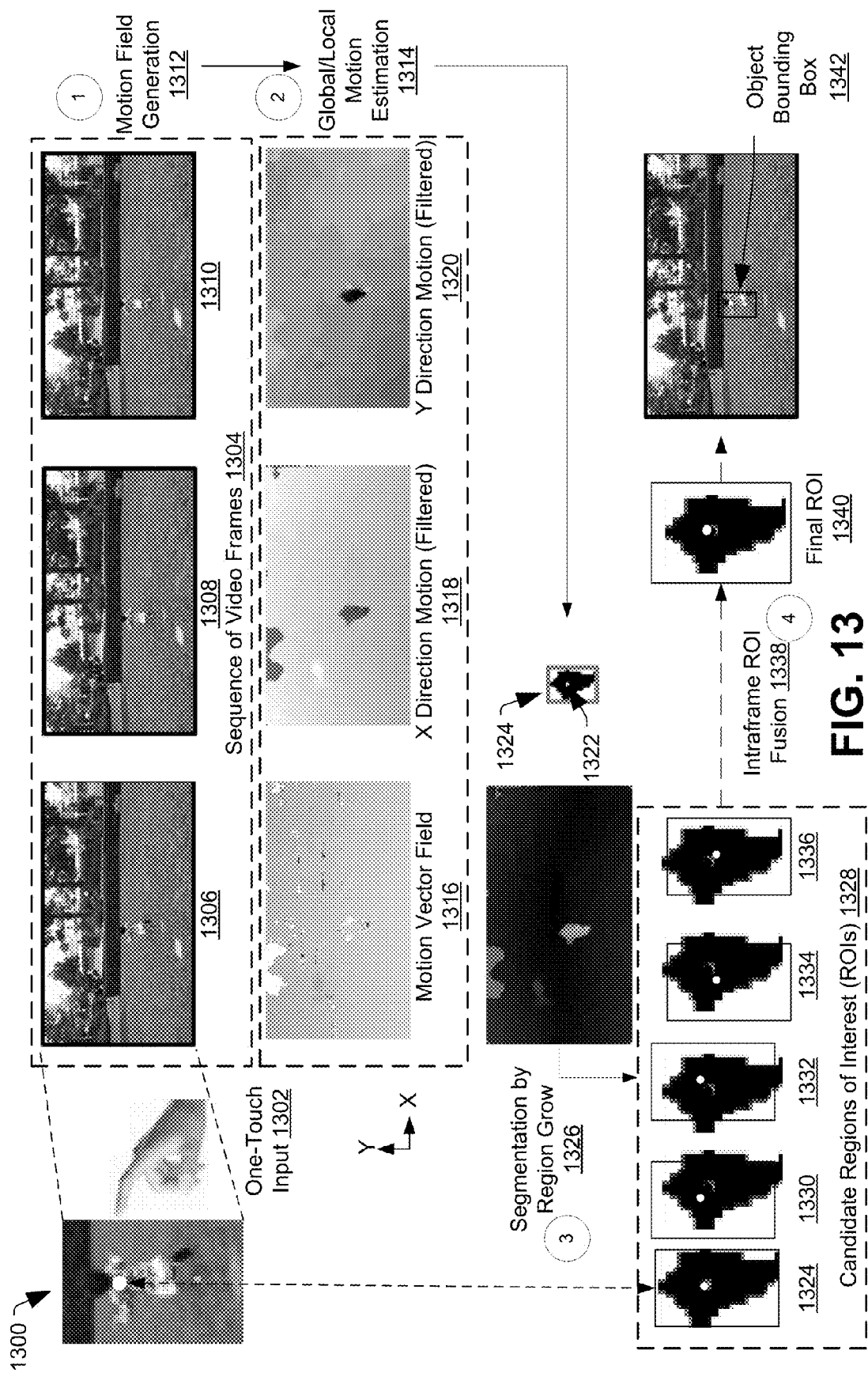
FIG. 13 is a diagram illustrating an example of a method of motion-based segmentation for object selection.

FIG. 13 is a diagram illustrating an example of a method 1300 of motion-based segmentation for object selection. In the example illustrated in FIG. 13, object selection using motion-based segmentation may be responsive to a one-touch input 1302 (e.g., responsive to a single user touch of a person in an image). In FIG. 13, the one-touch input 1302 is represented as a white dot on the back of the running child.

Responsive to the one-touch input 1302, motion may be detected based on at least two video frames. FIG. 13 illustrates an example in which a sequence of video frames 1304 including a first video frame 1306, a second video frame 1308, and a third video frame 1310 are used for motion field generation 1312. However, it will be appreciated that an alternative number of video frames may be used for motion field generation 1312. In some cases, a video encoder (e.g., video encoding hardware) may be used for global/local motion estimation 1314. In some cases, the video encoder may estimate motion using a subset of video encoding stages associated with motion estimation without performing other video encoding stages that are not associated with motion estimation.

FIG. 13 illustrates an example of a motion vector field 1316 generated by the video encoder. In some cases, the motion vector field 1316 may represent a dense motion vector field (e.g., a motion vector for every 8×8 block of pixels in a frame). While the motion vector field 1316 is illustrated in a grayscale format in FIG. 13, the motion vector field 1316 may include one or more colors. While the motion vector field 1316 may be noisy, the motion vector field 1316 of FIG. 13 illustrates that a moving person is discernible. For the global/local motion estimation 1314, further processing of the motion vector field 1316 may be performed. For example, FIG. 13 illustrates a first grayscale image 1318 that represents X direction (horizontal) motion in the motion vector field 1316 and a second grayscale image 1320 that represents Y direction (vertical) motion in the motion vector field 1316. In the particular example illustrated in FIG. 13, the first grayscale image 1318 represents the results of applying an X direction median filter to the motion vector field 1316, while the second grayscale image 1320 represents the results of applying a Y direction median filter to the motion vector field 1316. In alternative configurations, one or more different filters or sets of filters may be employed to further process the motion vector field 1316.

In a particular configuration, global motion estimation may include determining a median of all motion in both the X direction and the Y direction. Alternatively, other methods of global motion estimation may be employed. For example, an image may be divided into multiple regions (e.g., 8×8 pixel squares), a median of motion may be obtained for each region, and global motion may be estimated based on a median of the individual medians from the multiple regions. In a particular configuration, local motion estimation may include determining local motion vectors in individual portions of the image (e.g., in individual 8×8 pixel squares).

In the example illustrated in FIG. 13, the one-touch input 1302 may be used to separate local motion from global motion. That is, the one-touch input 1302 may be associated with X and Y coordinates in the motion vector field 1316, and these X and Y coordinates may represent a starting location to be used as a first seed 1322 for region growing. In FIG. 13, the first seed 1322 is represented by a dot, and a first region growing operation performed based on the first seed 1322 results in a first region of interest (ROI) 1324 (also referred to herein as a bounding region (e.g., bounding box)).

In some cases, a bounding box that is generated by region growing based on the one-touch input 1302 may not satisfy a bounding box size threshold associated with an object tracking application (e.g., the object tracking application 1204 of FIG. 12). As another example, a user may not accurately select a particular object via the one-touch input 1302. For example, it may be difficult for the user to select small objects (e.g., the soccer player associated with the bounding region 1224 in FIG. 12) and/or fast moving objects (e.g., the moving car 1212 in FIG. 12). Accordingly, while the one-touch input 1302 may provide a starting point for region growing, FIG. 13 illustrates a particular configuration of segmentation by region growing 1326 that uses one or more alternative seeds for region growing.

FIG. 13 illustrates that multiple candidate regions of interest (ROIs) 1328 (also referred to as bounding regions, for example) may be generated by region growing from multiple seeds. A first candidate ROI includes the first ROI 1324 that is generated by region growing using the one-touch input 1302 as the first seed 1322. FIG. 13 further illustrates a particular example in which four other seeds are used for region growing. However, it will be appreciated that an alternative number of seeds may be used for the segmentation by region growing 1326, resulting in an alternative number of candidate ROIs. In the example of FIG. 13, the four other seeds are neighboring X, Y coordinates with respect to the X, Y coordinates of the first seed 1322. In some cases, neighboring X, Y coordinates may include coordinates that are offset by n pixels (in a positive or negative direction), where n may be an integer that is fixed (e.g., 1) or programmable. As an illustrative, non-limiting example, region growing based on a second seed with alternative X, Y coordinates (e.g., X−1, Y+1) may result in a second candidate ROI 1330. As further examples, region growing based on a third seed with alternative coordinates (e.g., X+1, Y+1) may result in a third candidate ROI 1332, region growing based on a fourth seed with alternative coordinates (e.g., X−1, Y−1) may result in a fourth candidate ROI 1334, and region growing based on a fifth seed with alternative coordinates (e.g., X+1, Y−1) may result in a fifth candidate ROI 1336.

FIG. 13 further illustrates that intraframe ROI fusion 1338 (also referred to herein as spatial ROI fusion) may be performed on at least a subset of the candidate ROIs 1328 in order to generate a final ROI 1340. That is, the individual candidate ROIs 1324, 1330, 1332, 1334, and 1336 represent ROIs that are generated by individual region growing operations performed based on different seeds, and the final ROI 1340 represents a fused result of the individual region growing operations. In the particular example illustrated in FIG. 13, the final ROI 1340 is defined by a maximum X span and a maximum Y span of the individual candidate ROIs 1324, 1330, 1332, 1334, and 1336. Alternatively, one or more of the candidate ROIs 1324, 1330, 1332, 1334, and 1336 may be discarded, and intraframe ROI fusion 1338 may be performed on a subset of the candidate ROIs 1324, 1330, 1332, 1334, and 1336. To illustrate, one or more of the five candidate ROIs 1324, 1330, 1332, 1334, and 1336 may be discarded when they do not satisfy a size threshold (e.g., the ROI may be too small for object tracking). As another example, one or more of the five candidate ROIs 1324, 1330, 1332, 1334, and 1336 may be discarded when they exceed a size threshold (e.g., the ROI may be too large for object tracking). That is, a candidate ROI that is identified as an outlier based on one or more criteria (e.g., similarity to other candidate ROIs) may be discarded and may not be used to determine the final ROI 1340. FIG. 13 further illustrates a particular example in which the final ROI 1340 that is determined by intraframe ROI fusion 1338 is used as an object bounding box 1342 (e.g., for object tracking). For example, the object bounding box 1342 may be an initial bounding box that is used to track the child as the child runs in the scene. However, it will be appreciated that the final ROI 1340 may be used for other computer vision (CV) applications (e.g., for object recognition, for reality augmentation, or scene analysis, among other alternatives).

Thus, FIG. 13 illustrates that the motion vector field 1316 generated by a video encoder (e.g., video encoding hardware) may be used for segmentation and one-touch object selection. The example of one-touch object selection illustrated in FIG. 13 includes segmentation by region growing to generate multiple candidate ROIs and performing ROI fusion based on at least a subset of the candidate ROIs to determine a final ROI (e.g., for an object tracking application). While FIG. 13 illustrates a particular example that includes motion field generation 1312, global/local motion estimation 1314, segmentation by region grow 1326, and intraframe ROI fusion 1338, it will be appreciated that the order is not limiting. That is, alternative orders are possible, with more steps, fewer steps, different steps, concurrent steps, etc.

Figure 14:
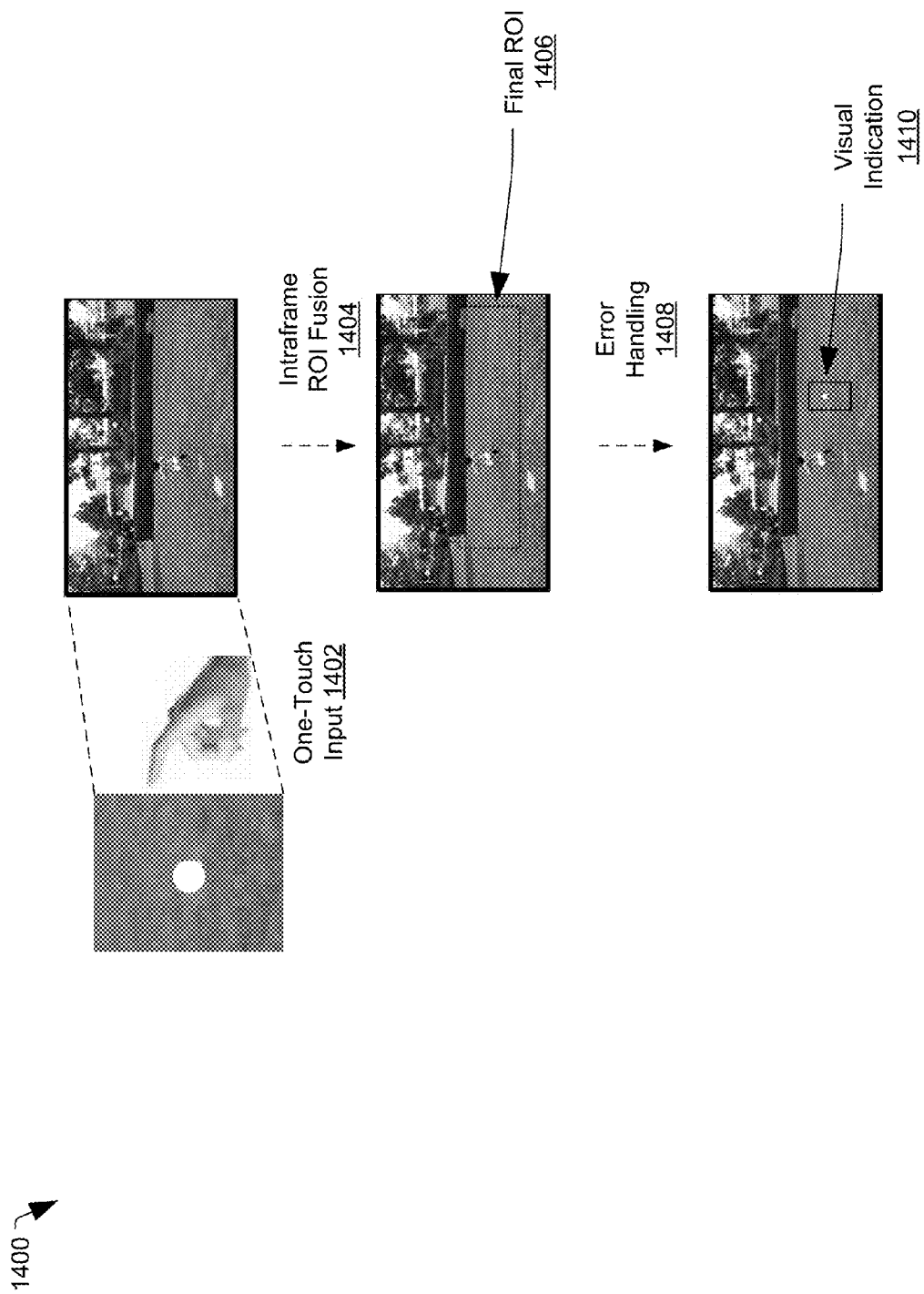
FIG. 14 is a diagram illustrating one configuration of a method of error handling in the context of motion-based segmentation for object selection.

FIG. 14 is a diagram illustrating one configuration of a method 1400 of error handling in the context of motion-based segmentation for object selection. In the example illustrated in FIG. 14, error handling may be responsive to a one-touch input 1402 (e.g., a user touch on a portion of an image that does not include an object with associated local motion). In FIG. 14, the one-touch input 1402 is represented as a white dot on a patch of grass.

FIG. 14 illustrates that performing intraframe ROI fusion 1404 responsive to a user touch on the grass may result in a final ROI 1406 that exceeds a size threshold (e.g., for object tracking). In the context of object tracking, the size threshold may be based on an assumption that the user would not be tracking an object as large as the size of the final ROI 1406. For tracking purposes, the size threshold may specify that the object be within a particular spatial range of the one-touch input 1402. To illustrate, the size threshold may specify that the object be smaller than a maximum object size and larger than a minimum object size. Additionally or alternatively, the size threshold may specify a minimum aspect ratio and a maximum aspect ratio for an object.

In the particular configuration illustrated in FIG. 14, error handling 1408 may include generating a visual indication 1410. The visual indication 1410 may alert a user that the one-touch user input 1402 was not successful in selecting the running child. The visual indication 1410 may prompt the user to provide another one-touch input. In some cases, the visual indication 1410 may include a bounding box having a default size that is generated based on the X, Y coordinates of the one-touch user input 1402.

While FIGS. 13 and 14 illustrate spatial segmentation for one-touch object selection, it will be appreciated that other types of segmentation may be used instead of or in addition to spatial segmentation. Further, while FIGS. 13 and 14 illustrate intraframe or spatial ROI fusion, it will be appreciated that other types of ROI fusion may be used instead or in addition to spatial ROI fusion.

Figure 15:
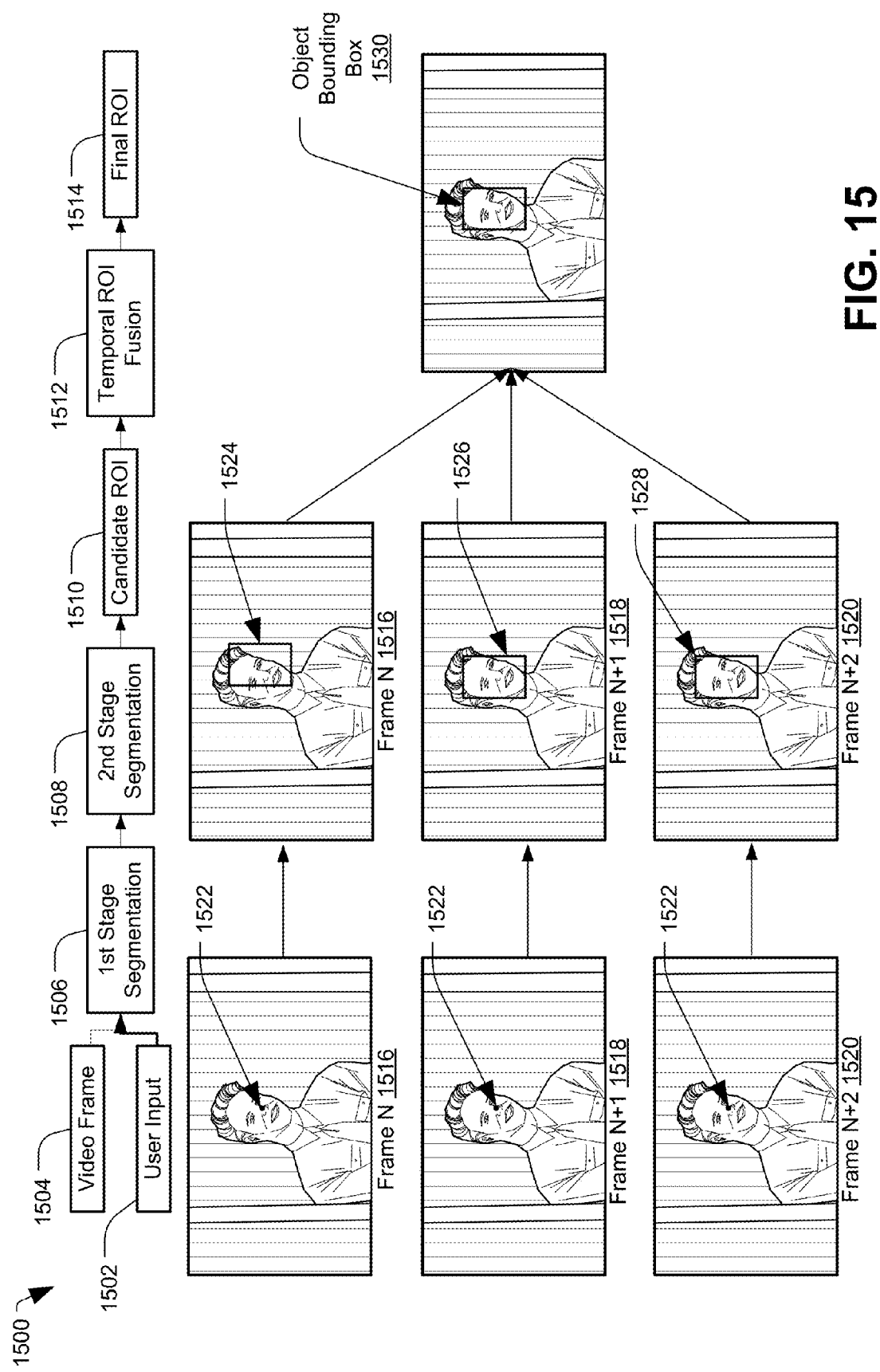
FIG. 15 illustrates a particular illustrative configuration of a method of color-based segmentation that includes temporal region of interest (ROI) fusion for one-touch object selection.

FIG. 15 illustrates a particular illustrative configuration of a method 1500 of color-based segmentation that includes temporal ROI fusion for one-touch object selection. FIG. 15 illustrates that two-stage segmentation may be performed for multiple video frames to generate multiple candidate ROIs, and temporal ROI fusion may be used to generate the final ROI. In some configurations, color-based segmentation may be performed when motion-based segmentation (e.g., as described with reference to FIGS. 13-14) fails.

FIG. 15 illustrates that the output of the color-based segmentation is a bounding box (as in the motion-based segmentation method described with respect to FIGS. 13-14), and the user input 1502 is a one-touch user input (as in the motion-based segmentation method described with respect to FIGS. 13-14). By contrast, FIG. 15 illustrates a temporal dual-segmentation approach (e.g., a two stage segmentation approach) followed by temporal ROI fusion rather than spatial ROI fusion as described with respect to FIGS. 13-14. To illustrate, for color-based segmentation, a predetermined number of video frames may be identified for segmentation (e.g., five frames). Color-based segmentation may be performed for each of the five frames, and the method may include identifying consistent segmentation results among the five frames. That is, in the motion-based segmentation approached described for FIG. 13, the ROI fusion is done spatially, and in the particular example of color-based segmentation illustrated in FIG. 15, the ROI fusion may be done temporally.

In FIG. 15, a user input 1502 may include a one-touch input. In response to the user input 1502, a two-stage segmentation may be performed for multiple video frames. That is, processing of a particular video frame 1504 may include a first stage segmentation 1506 and a second stage segmentation 1508, resulting in a candidate ROI 1510 associated with the particular video frame 1504. Multiple candidate ROIs may be generated, each associated with a particular video frame of the multiple video frames. In order to identify consistent segmentation results among the multiple video frames, temporal ROI fusion 1512 may be performed to generate a final ROI 1514.

For illustrative purposes only, FIG. 15 shows a first video frame 1516 ("Frame N"), a second video frame 1518 ("Frame N+1"), and a third video frame 1520 ("Frame N+2"). However, it will be appreciated that color-based segmentation may be performed for an alternative number of frames. In FIG. 15, a user touch location 1522 is shown in the first video frame 1516. Due to camera motion or motion of objects in the scene, objects may move from frame to frame. FIG. 15 illustrates that the user touch location 1522 may be propagated to subsequent frames. To illustrate, in the example of FIG. 15, the user touch location 1522 is on the tip of the nose, and this point on the tip of the nose may be propagated from the first video frame 1516 to the second video frame 1518. Further, the user touch location 1522 on the tip of the nose may be propagated from the second video frame 1518 to the third video frame 1520. In some cases, a motion vector field that is generated by a video encoder (as described above with respect to the motion vector field 1316) may be used to propagate the user touch location 1522 between frames.

For the first video frame 1516, the user touch location 1522 may be used to determine a starting region (e.g., a 5×5 box), and region growing may be used to grow the starting region into a mask. In some cases, if the mask fails to satisfy a size threshold (e.g., the mask is too large), region growing may be performed again using a larger starting region (e.g., a 7×7 box or a 9×9 box). In the color-based segmentation approach, region growing may be applied to red, green, and blue (RGB) color channel information, rather than X, Y coordinates (as in the motion-based approach of FIG. 13). Based on the mask, a first candidate ROI 1524 may be generated.

FIG. 15 illustrates an example of segmentation using a seeded region grow method. That is, the user provides a seed in the form of a single touch point (i.e., the user touch location 1522). In FIG. 15, a dual layer (also referred herein as dual-stage) approach includes a first layer starting from a 5×5 box centered on the user touch location 1522 that is grown into a region with area N (illustrated as the first stage segmentation 1506). In some cases, the area N may not satisfy a size threshold (e.g., the area N may be too small). Accordingly, a second layer starting from a box (centered on the user touch location 1522) having a different size (e.g., an M×M box with M greater than 5 in this case) may be grown into a region with area R (illustrated as the second stage segmentation 1508). In some cases, M may be determined based on N and may be proportional with N. In a particular configuration, a maximum size may be determined based on (⅓)frameHeight*(⅓)frameWidth, while a minimum size may be 16×16 pixels (among other alternative sizes). Further, in some cases, there may be a maximum aspect ratio and a minimum aspect ratio threshold. To illustrate, the aspect ratio thresholds may exclude tall, thin boxes or flat, narrow boxes.

For the second video frame 1518, the propagated user touch location 1522 may determine another starting box (e.g., a 5×5 box), region growing using RGB color channel information may be used to grow the starting box into a mask, and a second candidate ROI 1526 may be generated from the mask. Similarly, for the third video frame 1520, the propagated user touch location 1522 may determine another starting box (e.g., a 5×5 box), region growing using RGB color channel information may be used to grow the starting box into a mask, and a third candidate ROI 1528 may be generated from the mask.

The temporal ROI fusion 1512 may include determining the final ROI 1514 based on at least a subset of the candidate ROIs. That is, at least a subset of the first candidate ROI 1524, the second candidate ROI 1526, and the third candidate ROI 1528 may be used to determine the final ROI 1514. FIG. 15 illustrates that the final ROI 1514 may be used to generate an object bounding box 1530 (e.g., for object tracking).

Figure 16:
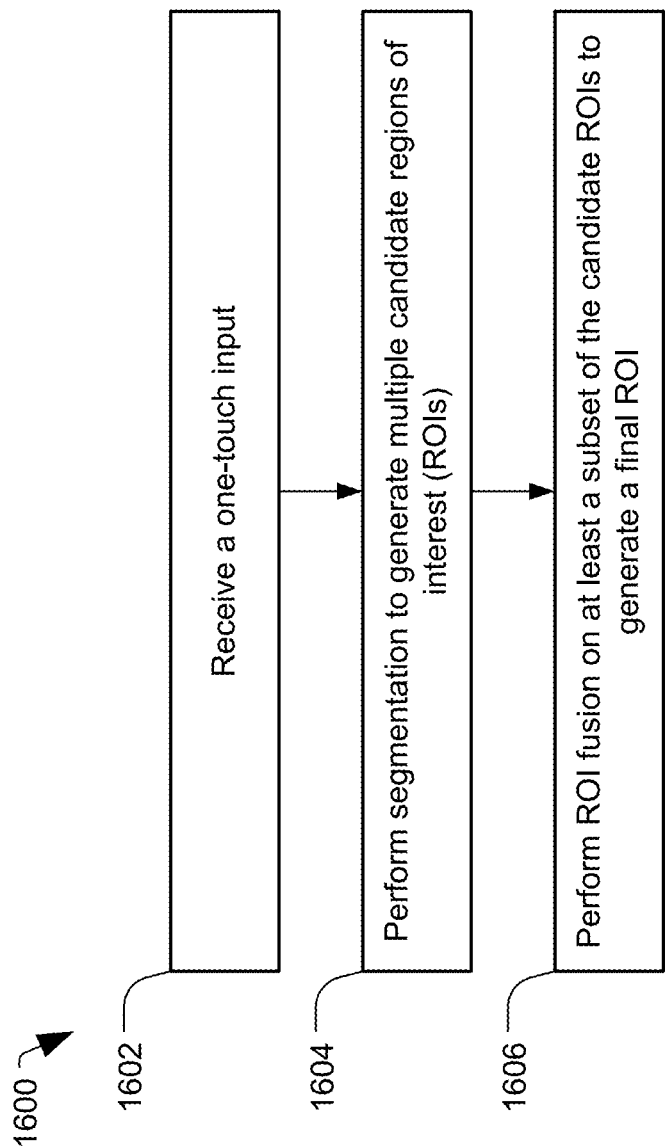
FIG. 16 is a flow diagram illustrating one configuration of a method of one-touch object selection by performing segmentation and ROI fusion.

FIG. 16 is a flow diagram illustrating one configuration of a method 1600 of one-touch object selection by performing segmentation and ROI fusion. In an illustrative configuration, the method 1600 may be performed by the mobile device 1002 of FIG. 10.

The method 1600 includes receiving a one-touch input, at 1602. For example, the one-touch input may include the one-touch input 1302 illustrated in FIG. 13 or the one-touch input 1402 illustrated in FIG. 14.

The method 1600 includes performing segmentation to generate multiple candidate regions of interest (ROIs), at 1604. For example, in some cases, segmentation may include the motion-based segmentation described with respect to FIG. 13. In other cases, the segmentation may include the color-based segmentation described with respect to FIG. 15. Alternatively, the segmentation may include both motion-based segmentation and color-based segmentation. To illustrate, both motion and color information may be examined when performing the segmentation. That is, both the XY coordinate information and the RGB color channel information may be used for segmentation.

The method 1600 includes performing ROI fusion on at least a subset of the candidate ROIs to generate a final ROI, at 1606. For example, performing ROI fusion may include performing the intraframe ROI fusion 1338 described with respect to FIG. 13. As another example, performing ROI fusion may include performing the temporal ROI fusion 1512 described with respect to FIG. 15.

Figure 17:
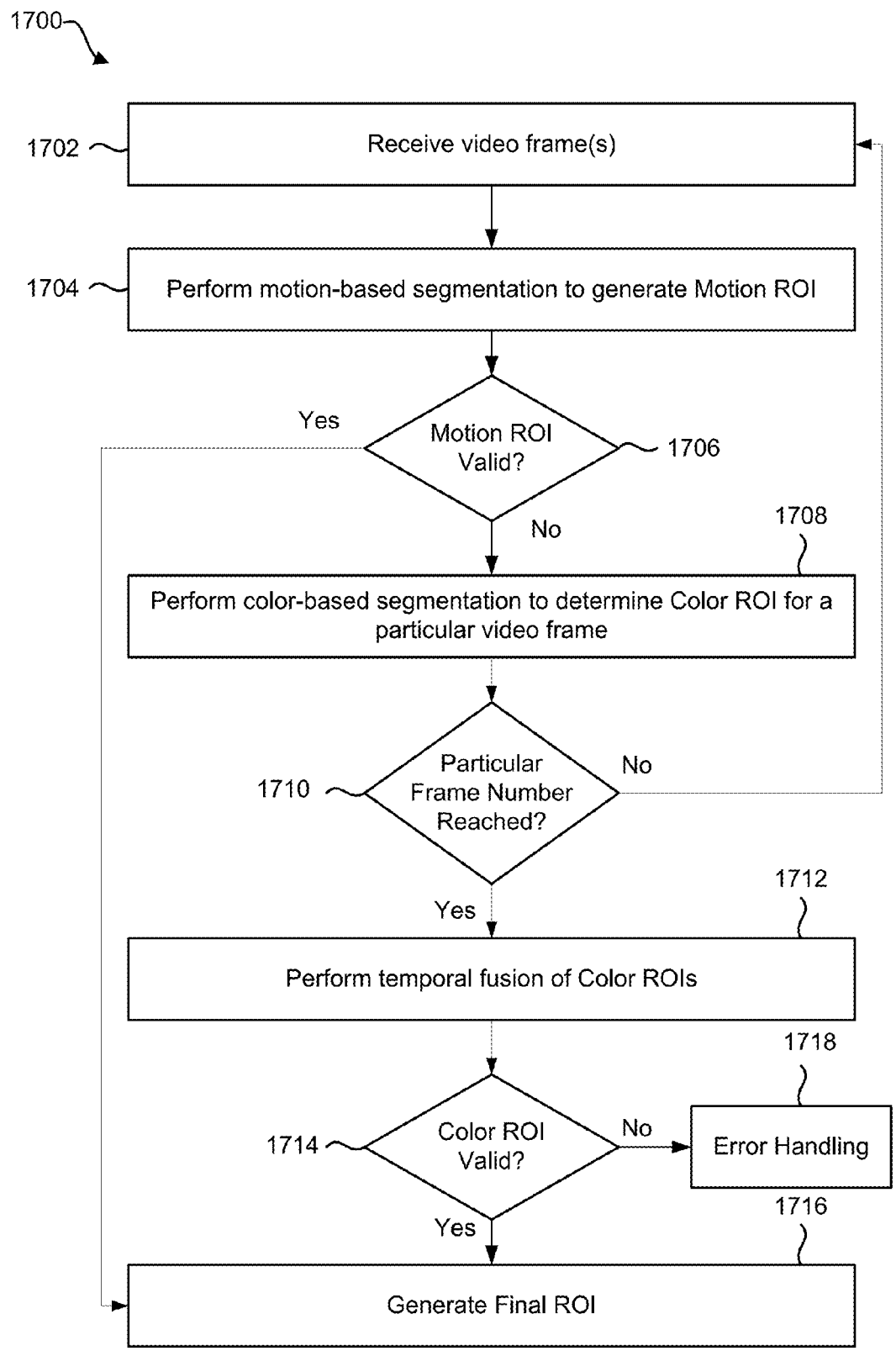
FIG. 17 is a flow diagram illustrating one configuration of a method of one-touch object selection using a combination of motion-based and color-based segmentation along with ROI fusion.

FIG. 17 is a flow diagram illustrating one configuration of a method 1700 of one-touch object selection using a combination of motion-based and color-based segmentation along with ROI fusion. In an illustrative configuration, the method 1700 may be performed by the mobile device 1002 of FIG. 10.

The method 1700 includes receiving video frame(s), at 1702, and performing motion-based segmentation to determine a motion ROI, at 1704. In the context of motion-based segmentation, a sequence of video frames may be received in order to estimate motion. For example, referring to FIG. 13, the sequence of video frames 1304 may be received, and the motion vector field 1316 may be generated by a video encoder based on the sequence of video frames 1304. As illustrated in FIG. 13, the segmentation by region growing 1326 may include generating multiple candidate ROIs 1328 and performing intraframe (spatial) ROI fusion 1338 on at least a subset of the candidate ROIs 1328.

At 1706, the method 1700 includes determining whether the ROI generated by the intraframe ROI fusion 1338 represents a valid ROI. For example, as described above with respect to FIG. 13, in some cases the ROI generated by ROI fusion may not satisfy a size threshold. For example, in the context of object tracking, the size threshold may be based on an assumption that the user would not be tracking an object as large as the ROI determined based on intraframe ROI fusion. For tracking purposes, the size threshold may specify that the object be within a particular spatial range of the one-touch input 1302. To illustrate, the size threshold may specify that the object be smaller than a maximum object size and larger than a minimum object size. Additionally or alternatively, the size threshold may specify a minimum aspect ratio and a maximum aspect ratio for an object.

When the motion ROI is valid, the method 1700 may include generating a final ROI, at 1716. That is, in the particular configuration illustrated in FIG. 17, the fused ROI generated using the motion-based segmentation approach may be considered a higher priority or sufficient result, and the method 1700 may not include performing color-based segmentation. In some cases, an object bounding box may be generated based on the final ROI. To illustrate, referring to FIG. 13, the object bounding box 1342 may be generated based on the final ROI 1340.

When the motion ROI is determined to be invalid at 1706, the method 1700 may include performing color-based segmentation to determine a color ROI for a particular video frame, at 1708. That is, in the particular configuration illustrated in FIG. 17, color-based segmentation may be performed when motion-based segmentation fails. To illustrate, referring to FIG. 15, color-based segmentation may be performed on the first video frame 1516. For the first video frame 1516, the user touch location 1522 may be used to determine a starting region (e.g., a 5×5 box), and region growing may be used to grow the starting region into a mask. In some cases, if the mask is too large, region growing may be performed again using a larger starting region (e.g., a 7×7 box or a 9×9 box). In the color-based segmentation approach, region growing may be applied to red, green, and blue (RGB) color channel information, rather than X, Y coordinates (as in the motion-based segmentation approach of FIG. 13). Based on the mask, a first candidate ROI 1524 may be generated.

The method 1700 includes determining whether a particular (e.g., a maximum) frame number has been reached, at 1710. That is, color-based segmentation may be performed for a particular number of frames (e.g., five frames), and the method 1700 may return to 1702 to receive information associated with another frame until the particular number of frames for color-based segmentation has been reached or until the motion ROI is valid. To illustrate, referring to the example of FIG. 15, three frames are illustrated. After performing the color-based segmentation on the first video frame 1516 to determine the first candidate ROI 1524, color-based segmentation may be performed on the second video frame 1518 to determine the second candidate ROI 1526. After performing the color-based segmentation on the second video frame 1518 to determine the second candidate ROI 1526, color-based segmentation may be performed on the third video frame 1520.

When the particular number of frames has been reached at 1710, the method 1700 includes performing temporal ROI fusion of color ROIs, at 1712. To illustrate, referring to FIG. 15, the temporal ROI fusion 1512 may be performed on the first candidate ROI 1524, the second candidate ROI 1526, and the third candidate ROI 1528. At 1714, the method 1700 includes determining whether the fused color ROI is valid. To illustrate, referring to FIG. 15, the final ROI 1514 that represents the results of the temporal ROI fusion 1512 of the candidate ROIs 1524, 1526, and 1528 may be evaluated to determine validity. When the fused color ROI is valid, the method 1700 proceeds to 1716, where the final ROI resulting from the color-based segmentation (e.g., the final ROI 1514 in FIG. 15) is determined to be (e.g., generated as) the final ROI. In some cases, an object bounding box may be generated based on the final ROI. To illustrate, referring to FIG. 15, the object bounding box 1530 may be generated based on the final ROI 1514.

In particular configurations, the method 1600 of FIG. 16 and the method 1700 of FIG. 17 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method 1600 of FIG. 16 and the method 1700 of FIG. 17 can be performed by a processor that executes instructions, as described with respect to FIG. 18.

Figure 18:
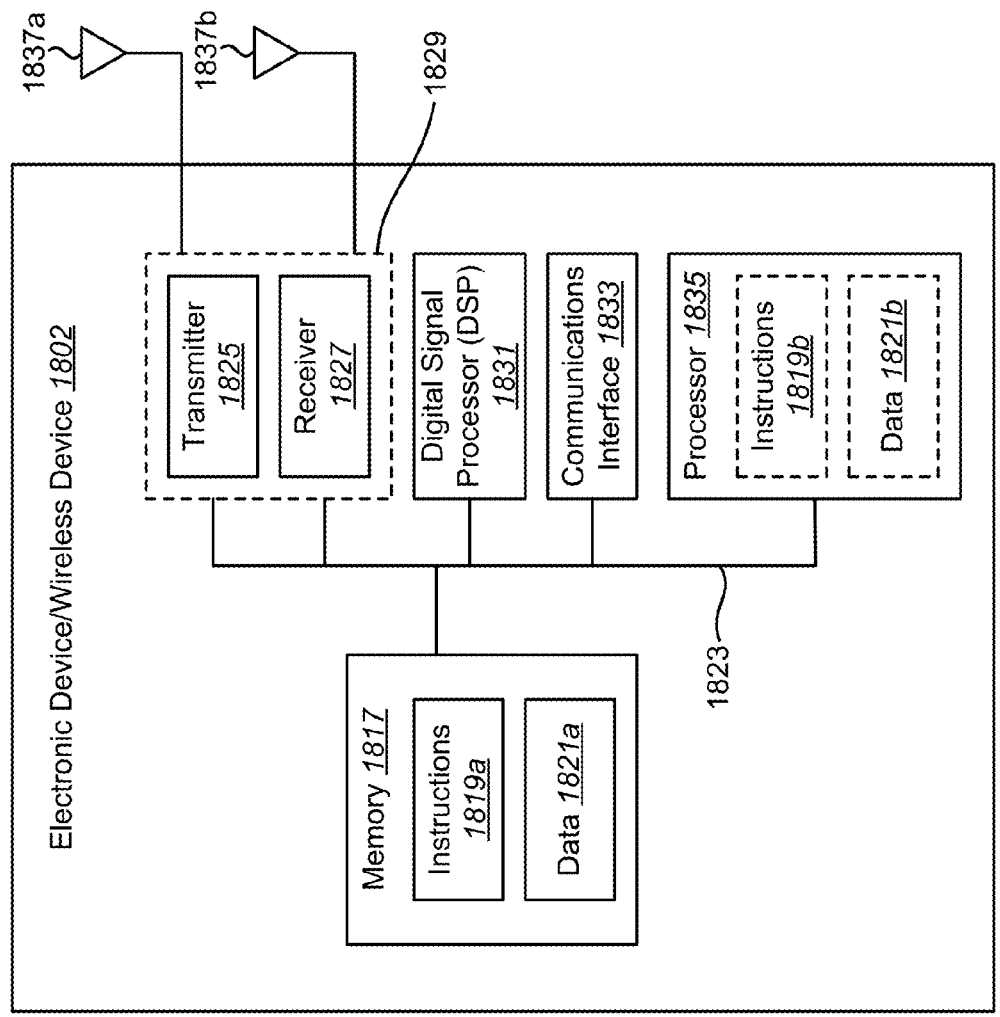
FIG. 18 illustrates certain components that may be included within an electronic device and/or wireless device configured to implement various configurations of the systems and methods disclosed herein.

FIG. 18 illustrates certain components that may be included within an electronic device and/or wireless device 1802 configured to implement various configurations of the systems and methods disclosed herein. The electronic device/wireless device 1802 may be an access terminal, a mobile station, a user equipment (UE), a smartphone, a digital camera, a video camera, a tablet device, a laptop computer, etc. (e.g., an electronic device 208, mobile device 1002, etc.). The electronic device/wireless device 1802 may be implemented in accordance with one or more of the electronic device 208 and mobile device 1002 described herein. The electronic device/wireless device 1802 includes a processor 1835. The processor 1835 may be a general purpose single- or multi-chip microprocessor (e.g., an ARM), a special purpose microprocessor (e.g., a digital signal processor (DSP)), a microcontroller, a programmable gate array, etc. The processor 1835 may be referred to as a central processing unit (CPU). Although just a single processor 1835 is shown in the electronic device/wireless device 1802, in an alternative configuration, a combination of processors (e.g., an ARM and DSP) could be used.

The electronic device/wireless device 1802 also includes memory 1817. The memory 1817 may be any electronic component capable of storing electronic information. The memory 1817 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1821a and instructions 1819a may be stored in the memory 1817. The instructions 1819a may be executable by the processor 1835 to implement one or more of the methods described herein. Executing the instructions 1819a may involve the use of the data that is stored in the memory 1817. When the processor 1835 executes the instructions 1819, various portions of the instructions 1819b may be loaded onto the processor 1835, and various pieces of data 1821b may be loaded onto the processor 1835.

The electronic device/wireless device 1802 may also include a transmitter 1825 and a receiver 1827 to allow transmission and reception of signals to and from the electronic device/wireless device 1802. The transmitter 1825 and receiver 1827 may be collectively referred to as a transceiver 1829. Multiple antennas 1837a-b may be electrically coupled to the transceiver 1829. The electronic device/wireless device 1802 may also include (not shown) multiple transmitters, multiple receivers, multiple transceivers and/or additional antennas.

The electronic device/wireless device 1802 may include a digital signal processor (DSP) 1831. The electronic device/wireless device 1802 may also include a communications interface 1833. The communications interface 1833 may enable one or more kinds of input and/or output. For example, the communications interface 1833 may include one or more ports and/or communication devices for linking other devices to the electronic device/wireless device 1802. Additionally or alternatively, the communications interface 1833 may include one or more other interfaces (e.g., touchscreen, keypad, keyboard, microphone, camera, etc.). For example, the communication interface 1833 may enable a user to interact with the electronic device/wireless device 1802.

The various components of the electronic device/wireless device 1802 may be coupled together by one or more buses, which may include a power bus, a control signal bus, a status signal bus, a data bus, etc. For the sake of clarity, the various buses are illustrated in FIG. 18 as a bus system 1823.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
    generating a plurality of bounding regions based on an image;
    determining a subset of the plurality of bounding regions based on a color difference criterion and a selected area in the image, wherein the color difference criterion distinguishes between bounding regions based on a color distance between a bounding region and a respective surrounding region; and
    processing the image based on the subset of the plurality of bounding regions.

2. The method of claim 1, wherein determining the subset of the plurality of bounding regions is further based on a centeredness of each of the plurality of bounding regions relative to the selected area.

3. The method of claim 1, wherein determining the subset of the plurality of bounding regions is further based on a comparison between a color histogram of each bounding region and a color histogram of each respective surrounding region.

4. The method of claim 1, wherein determining the subset of the plurality of bounding regions is further based on an average size of the plurality of bounding regions.

5. The method of claim 4, wherein the average size is at least one of a median size and mean size.

6. The method of claim 1, wherein processing the image comprises performing one or more of object recognition, object tracking, focusing, object removal, image enhancement, cropping or compression.

7. The method of claim 1, wherein generating the plurality of bounding regions is based on a gradient-based bounding region generation algorithm.

8. The method of claim 1, wherein determining a subset of the plurality of bounding regions based on the color difference criterion and the selected area in the image comprises:
    rejecting any of the plurality of bounding regions that fail one or more of a centeredness criterion or a first size criterion; and
    selecting a bounding region that meets one or more of the color difference criterion or a second size criterion.

9. The method of claim 8, wherein the second size criterion is met for a bounding region with a weighted median size or a weighted mean size.

10. The method of claim 1, wherein determining a subset of the plurality of bounding regions based on the color difference criterion and the selected area in the image comprises:
    rejecting any of the plurality of bounding regions that fail a centeredness criterion to produce a plurality of remaining bounding regions;

determining a color distance between each of the plurality of remaining bounding regions and a respective surrounding region; and selecting a bounding region with a largest color distance.

11. An electronic device, comprising:
a processor configured to generate a plurality of bounding regions based on an image, to determine a subset of the plurality of bounding regions based on a color difference criterion and a selected area in the image, wherein the color difference criterion distinguishes between bounding regions based on a color distance between a bounding region and a respective surrounding region, and to process the image based on the subset of the plurality of bounding regions.

12. The electronic device of claim 11, wherein the processor is configured to determine the subset of the plurality of bounding regions further based on a centeredness of each of the plurality of bounding regions relative to the selected area.

13. The electronic device of claim 11, wherein the processor is configured to determine the subset of the plurality of bounding regions further based on a comparison between a color histogram of each bounding region and a color histogram of each respective surrounding region.

14. The electronic device of claim 11, wherein the processor is configured to determine the subset of the plurality of bounding regions further based on an average size of the plurality of bounding regions.

15. The electronic device of claim 14, wherein the average size is at least one of a median size and mean size.

16. The electronic device of claim 11, wherein the processor is configured to process the image by performing one or more of object recognition, object tracking, focusing, object removal, image enhancement, cropping or compression.

17. The electronic device of claim 11, wherein the electronic device further comprises:
an image sensor coupled to the processor, wherein the image sensor is configured to capture the image;
a memory coupled to the processor, wherein the memory is configured to store bounding region data;
a display coupled to the processor, wherein the display is configured to present the image; and
an input interface coupled to the processor, wherein the input interface is configured to receive input indicating the selected area.

18. The electronic device of claim 11, wherein the processor is configured to:
reject any of the plurality of bounding regions that fail one or more of a centeredness criterion or a first size criterion; and
select a bounding region that meets one or more of the color difference criterion or a second size criterion.

19. The electronic device of claim 18, wherein the second size criterion is met for a bounding region with a weighted median size or a weighted mean size.

20. The electronic device of claim 11, wherein the processor is configured to:
reject any of the plurality of bounding regions that fail a centeredness criterion to produce a plurality of remaining bounding regions;
determine a color distance between each of the plurality of remaining bounding regions and a respective surrounding region; and
select a bounding region with a largest color distance.

21. A computer-program product, comprising a non-transitory computer-readable medium having instructions thereon, the instructions comprising:
code for causing an electronic device to generate a plurality of bounding regions based on an image;
code for causing the electronic device to determine a subset of the plurality of bounding regions based on a color difference criterion and a selected area in the image,
wherein the color difference criterion distinguishes between bounding regions based on a color distance between a bounding region and a respective surrounding region; and
code for causing the electronic device to process the image based on the subset of the plurality of bounding regions.

22. The computer-program product of claim 21, comprising code for causing the electronic device to determine the subset of the plurality of bounding regions further based on a centeredness of each of the plurality of bounding regions relative to the selected area.

23. The computer-program product of claim 21, comprising code for causing the electronic device to determine the subset of the plurality of bounding regions further based on a comparison between a color histogram of each bounding region and a color histogram of each respective surrounding region.

24. The computer-program product of claim 21, comprising code for causing the electronic device to determine the subset of the plurality of bounding regions further based on an average size of the plurality of bounding regions.

25. The computer-program product of claim 21, comprising code for causing the electronic device to perform one or more of object recognition, object tracking, focusing, object removal, image enhancement, cropping or compression.

26. The computer-program product of claim 21, wherein the code for causing the electronic device to determine a subset of the plurality of bounding regions based on the color difference criterion and the selected area in the image comprises:
code for causing the electronic device to reject any of the plurality of bounding regions that fail a centeredness criterion to produce a plurality of remaining bounding regions;
code for causing the electronic device to determine a color distance between each of the plurality of remaining bounding regions and a respective surrounding region; and
code for causing the electronic device to select a bounding region with a largest color distance.

* * * * *